United States Patent [19]

Matsubara et al.

[11] Patent Number: 5,733,223
[45] Date of Patent: Mar. 31, 1998

[54] LOCK-UP CLUTCH SLIP CONTROL DURING VEHICLE DECELERATION WHICH IS TERMINATED AT DIFFERENT TRANSMISSION INPUT SPEEDS DEPENDING UPON VEHICLE RUNNING CONDITION

[75] Inventors: Tooru Matsubara; Kunihiro Iwatsuki, both of Toyota, Japan

[73] Assignee: Toyota Jidosha Kabushiki Kaisha, Toyota, Japan

[21] Appl. No.: 694,351

[22] Filed: Aug. 8, 1996

[30] Foreign Application Priority Data

Aug. 9, 1995 [JP] Japan ................... 7-202984

[51] Int. Cl.$^6$ .................................... F16H 61/14
[52] U.S. Cl. .................. 477/175; 477/64; 477/169
[58] Field of Search .................... 477/64, 65, 70, 477/71, 77, 80, 84, 85, 90, 91, 170, 169, 172, 175, 176

[56] References Cited

U.S. PATENT DOCUMENTS

| | | | |
|---|---|---|---|
| 4,825,366 | 4/1989 | Yamamoto et al. | 364/424.1 |
| 5,480,363 | 1/1996 | Matsubara et al. | 477/80 X |
| 5,547,438 | 8/1996 | Nozaki et al. | 477/169 |
| 5,611,750 | 3/1997 | Kono et al. | 477/169 X |
| 5,620,390 | 4/1997 | Kono et al. | 477/65 |
| 5,626,535 | 5/1997 | Kono et al. | 477/169 |
| 5,626,536 | 5/1997 | Kono et al. | 477/169 X |
| 5,643,136 | 7/1997 | Kono et al. | 477/175 X |

FOREIGN PATENT DOCUMENTS

| | | |
|---|---|---|
| 59-137659 | 8/1984 | Japan . |
| 61-102341 | 5/1986 | Japan . |
| 1-182665 | 7/1989 | Japan . |
| 7-103329 | 4/1995 | Japan . |

*Primary Examiner*—Khoi Q. Ta
*Assistant Examiner*—Peter T. Kwon
*Attorney, Agent, or Firm*—Oblon, Spivak, McClelland, Maier & Neustadt, P.C.

[57] ABSTRACT

An apparatus for controlling a slip speed of a lock-up clutch interposed between an engine and an automatic transmission of a motor vehicle, the apparatus including a slip control device for effecting a deceleration slip control of the lock-up clutch during vehicle deceleration for controlling the slip speed of the clutch, a detector for detecting a currently established position of the transmission, or an operation of a vehicle braking system or an air conditioner, and a control terminating device for substantially terminating the deceleration slip control of the clutch when the speed of the transmission input shaft has been lowered to a threshold value which is determined depending upon the speed ratio of the currently established position of the transmission, or whether the braking system or air conditioner is in operation or not.

14 Claims, 14 Drawing Sheets

FIG. 2

| SHIFT POSITION | | | SOLENOID VALVES | | | | | | CLUTCHES | | | BRAKES | | | | |
|---|---|---|---|---|---|---|---|---|---|---|---|---|---|---|---|---|---|
| | | | No.1 | No.2 | No.3 | No.4 | SLU | SLN | C-1 | C-2 | C-0 | B-1 | B-2 | B-3 | B-4 | B-0 |
| P | | | ○ | X | X | X | X | X | X | X | X | X | X | X | ○ | X |
| R | (V<20) | | X | X | X | ○ | X | X | X | ○ | X | X | X | X | ○ | ○ |
| R | (V≧20) | | ○ | ○ | X | ○ | X | X | X | ○ | X | X | X | X | X | X |
| N | | | ○ | X | X | X | X | X | X | X | X | X | X | X | ○ | X |
| D・3・2・(L) | 1st | NORMAL | ○ | X | ○ | ○ | X | X | ○ | X | ○ | X | X | X | ○ | X |
| | | ENGINE BRAKE | ○ | X | ○ | X | X | ○ | ○ | X | X | X | X | X | ○ | X |
| | 2nd | NORMAL | ○ | ○ | ○ | ○ | X | X | ○ | X | ○ | X | X | X | X | X |
| | | ENGINE BRAKE | ○ | ○ | ○ | X | X | ○ | ○ | X | X | X | X | ○ | X | X |
| | 3rd | NORMAL | X | ○ | ○ | ○ | ◎ | ○ | ○ | X | ○ | X | X | ○ | X | X |
| | | ENGINE BRAKE | X | ○ | ○ | X | ◎ | X | ○ | X | ○ | X | ○ | X | X | X |
| | 4th | | X | ○ | X | ○ | ◎ | ○ | ○ | ○ | ○ | X | ○ | X | X | X |
| | 5th | | X | X | X | ○ | ◎ | X | ○ | ○ | X | X | ○ | X | X | ○ |

LEGEND:
○ ON / ENGAGED / ON; L-UP ON
X OFF / RELEASED / OFF; L-UP OFF
◎ —

LOCK-UP CLUTCH SLIP CONTROL DURING VEHICLE DECELERATION WHICH IS TERMINATED AT DIFFERENT TRANSMISSION INPUT SPEEDS DEPENDING UPON VEHICLE RUNNING CONDITION

BACKGROUND OF THE INVENTION

1. Field of the Invention

The present invention relates to an apparatus for controlling the amount of slip of a lock-up clutch which is provided in a power transmitting system of a motor vehicle, for direct connection of an engine to an automatic transmission.

2. Discussion of the Related Art

There is known a motor vehicle having a fluid-filled power transmitting device equipped with a lock-up clutch, such as a torque converter or fluid coupling incorporating such a lock-up clutch. Such a motor vehicle is provided with a slip control apparatus for controlling the amount of slip of the lock-up clutch, which is a difference between the speed of an engine and the speed of the input shaft of an automatic transmission. The slip control apparatus includes slip control means which is operated during deceleration or coasting of the vehicle, for the purpose of improving the fuel economy of the vehicle. Described in detail, the slip control means is operated with a fuel-cut control device which is adapted to cut a fuel supply to the engine while the engine speed is higher than a predetermined fuel-cut speed during deceleration of the vehicle. The slip control of the lock-up clutch by the slip control apparatus is effected for raising the engine speed by a drive force transmitted to the engine from the vehicle drive wheels through the partially engaging or slipping lock-up clutch, so that the engine speed is kept above the fuel-cut speed for a prolonged period of time, to thereby effect the fuel cut of the engine for such a prolonged period of time. Thus, the operation of the slip control means to control the amount of slip of the lock-up clutch during deceleration of the vehicle (hereinafter referred to as "deceleration slip control" of the lock-up clutch) results in an improvement in the fuel economy of the vehicle. An example of such a slip control apparatus for the lock-up clutch is disclosed in JP-A-7-103329.

The deceleration slip control of the lock-up clutch by such a slip control apparatus known in the art is terminated when the engine speed is lowered to a predetermined lower limit (hereinafter referred to as "deceleration slip control terminating speed") which is close to the fuel-cut speed. The fuel-cut speed is determined to be slightly higher than the idling speed of the engine, since the fuel supply to the engine should be resumed to maintain the idling speed of the engine after the speed of the input shaft of the automatic transmission minus the slip speed of the lock-up clutch has been lowered down to the idling speed of the engine. Therefore, after the engine has been lowered below the fuel-cut speed, the purpose of the deceleration slip control of the lock-up clutch of prolonging the duration of the fuel cut control of the engine is lost. Accordingly, the deceleration slip control terminating speed at which the deceleration slip control is terminated is determined to be in the neighborhood of the fuel-cut speed which is slightly higher than the engine idling speed.

During the deceleration slip control of the lock-up clutch, the engine is driven by a force transmitted from the input shaft of the automatic transmission, and the engine speed is raised by the input shaft. In other words, the drive force is transmitted in the negative direction from the automatic transmission (from the drive wheels) toward the engine, and so-called "engine brake" is applied to the vehicle, so that a negative drive force acts on the vehicle so as to decelerate the engine. In other words, the deceleration slip control of the lock-up clutch tends to cause a negative drive force acting on the vehicle and negative acceleration of the vehicle (i.e., deceleration of the vehicle). As indicated by one-dot chain line in the graph of FIG. 10, the negative drive force is held substantially constant while the input shaft speed $N_T$ (speed of the turbine runner of the torque converter) of the transmission is comparatively high during the deceleration slip control of the lock-up clutch. However, the engine speed is rapidly raised due to the resumption of the fuel supply which occurs upon or shortly before or after the termination of the deceleration slip control, because the deceleration slip control terminating speed is close to the fuel-cut speed. As a result of a rise of the engine speed, the difference of the engine speed with respect to the input shaft speed $N_T$ of the transmission is reduced, namely, the amount of rise of the engine speed by the negative drive force transmitted from the transmission input shaft is almost zeroed, so that the negative drive force acting on the vehicle is rapidly reduced toward zero and eventually zeroed.

When the gear ratio or speed ratio of the currently established operating position of the automatic transmission is comparatively high, the negative drive force is larger than when the gear or speed ratio of the currently established operating position is comparatively low. The gear or speed ratio of the automatic transmission is defined as a ratio of the input shaft speed to the output shaft speed (input shaft speed/output shaft speed). Accordingly, the amount of decrease of the negative drive force upon or immediately after termination of the deceleration slip control of the lock-up clutch is comparatively large as indicated at D3 in FIG. 10, when the currently establishing position (e.g., 3rd-speed position) of the transmission has a comparatively high speed ratio.

When the braking system of the vehicle is not in operation, the negative drive force is produced by the "engine brake" only during deceleration of the vehicle. Therefore, the amount of change of the drive force upon termination of the deceleration slip control of the lock-up clutch is larger when the braking system is not in operation than when the braking system is in operation for braking the vehicle or positively applying a negative drive force to the vehicle. Consequently, the termination of the deceleration slip control may cause a change of the negative acceleration of the vehicle, which is unexpected to the vehicle operator and gives a discomfort.

A motor vehicle is generally equipped with an air conditioner or other device which is activated when needed. Such a device is referred to as an optionally activated device or an optional device. In this case, the target idling speed of the engine is raised by about 100-200 r.p.m. from the normal target engine idling speed, when the optional device is operated. Since the raised target engine idling speed is higher than the deceleration slip control terminating speed of the engine, the actual engine speed is rapidly raised toward the raised target value when the deceleration slip control of the lock-up clutch is terminated. This phenomenon also gives a discomfort to the vehicle operator.

SUMMARY OF THE INVENTION

It is therefore an object of the present invention to provide a slip control apparatus which is adapted to minimize the amount of change of a negative drive force or the amount of rise of the engine speed due to termination of the deceleration slip control of the lock-up clutch, to thereby minimize the discomfort to be given to the vehicle operator due to a change in the negative acceleration of the vehicle upon termination of the deceleration slip control.

The above object may be achieved according to a first aspect of this invention, which provides an apparatus for controlling a slip speed of a lock-up clutch interposed between an engine and an automatic transmission of a motor vehicle for direct connection therebetween, the apparatus including slip control means capable of effecting a deceleration slip control of the lock-up clutch during deceleration of the motor vehicle such that a difference between a rotating speed of the engine and a rotating speed of an input shaft of the automatic transmission is controlled as the slip speed, the apparatus comprising: (a) shift position detecting means for detecting a currently established operating position of the automatic transmission; and (b) deceleration slip control terminating means for substantially terminating the deceleration slip control of the lock-up clutch by the slip control means when the rotating speed of the input shaft of the automatic transmission has been lowered to a threshold value which is determined depending upon a speed ratio of the currently established operating position detected by the shift position detecting means such that the threshold value is larger when the speed ratio of the currently established operating position is comparatively high than when the speed ratio is comparatively low, the speed ratio being equal to the rotating speed of the input shaft divided by a rotating speed of an output shaft of the automatic transmission.

In the slip control apparatus constructed as described above according to the first aspect of this invention, the currently established operating position of the automatic transmission is detected by the shift position detecting means, and the deceleration slip control of the lock-up clutch by the slip control means is substantially terminated by the deceleration slip control terminating means when the input shaft speed of the transmission has been lowered to the predetermined threshold value. This threshold value is higher when the currently established position of the transmission is comparatively high than when it is comparatively low. According to this arrangement, the effect of the input shaft speed of the transmission to raise the speed of the engine is reduced when the input shaft speed is comparatively high when the transmission is currently placed in the operating position whose speed ratio is comparatively high. In other words, when the currently established position of the transmission is comparatively high, the deceleration slip control of the lock-up clutch is substantially terminated when the input shaft speed of the transmission is sufficiently higher than the idling speed of the engine. Consequently, upon and immediately after the termination of the deceleration slip control of the lock-up clutch incorporated in a fluid-filled power transmitting device such as a torque converter, the rotary motion of the input shaft of the transmission rotating at the comparatively high speed is transmitted to the engine via a working fluid in the fluid-filled power transmitting device, whereby a negative drive force is given by the engine to the vehicle while the engine speed is maintained at a level sufficiently higher than the idling speed.

Thus, the present slip control apparatus for the lock-up clutch is arranged to terminate the deceleration slip control of the lock-up clutch when the engine speed has been lowered to a level close to the idling speed, so that the amount of decrease of the negative drive force immediately after the termination of the deceleration slip control is considerably smaller, even when the transmission is placed in the position having a comparatively high speed ratio (gear ratio), than in the conventional apparatus wherein the negative drive force is rapidly reduced to almost zero. Accordingly, the present arrangement is effective to eliminate a discomfort which would be given to the vehicle operator due to a large amount of decrease of the negative drive force immediately after the termination of the deceleration slip control of the lock-up clutch.

The above object may also be achieved according to a second aspect of this invention, which provides apparatus for controlling a slip speed of a lock-up clutch interposed between an engine and an automatic transmission of a motor vehicle for direct connection therebetween, the apparatus having a braking system and including slip control means capable of effecting a deceleration slip control of the lock-up clutch during deceleration of the motor vehicle such that a difference between a rotating speed of the engine and a rotating speed of an input shaft of the automatic transmission is controlled as the slip speed, the apparatus comprising: (i) brake operation detecting means for detecting an operation of the braking system; and (ii) deceleration slip control terminating means for substantially terminating the deceleration slip control of the lock-up clutch by the slip control means when the rotating speed of the input shaft of the automatic transmission has been lowered to a threshold value which is determined depending upon an output of the brake operation detecting means, such that the threshold value is larger when the braking system is not in operation than when the braking system is in operation.

In the slip control apparatus constructed as described above according to the second aspect of this invention, an operation of the braking system is detected by the brake operation detecting means, and the deceleration slip control of the lock-up clutch by the slip control means is substantially terminated by the deceleration slip control terminating means when the input shaft speed of the transmission has been lowered to the predetermined threshold value. This threshold value is higher when the braking system is not in operation than when the braking system is in operation. According to this arrangement, the effect of the input shaft speed of the transmission to raise the speed of the engine is reduced when the input shaft speed is comparatively high when the braking system is not in operation. In other words, when the braking system is not operated, the deceleration slip control of the lock-up clutch is substantially terminated when the input shaft speed of the transmission is sufficiently higher than the idling speed of the engine. Consequently, upon and immediately after the termination of the deceleration slip control of the lock-up clutch, the rotary motion of the input shaft of the transmission rotating at the comparatively high speed is transmitted to the engine via the working fluid in the fluid-filled power transmitting device, whereby a negative drive force is given by the engine to the vehicle while the engine speed is maintained at a level sufficiently higher than the idling speed.

Thus, the present slip control apparatus according to the second aspect of the invention is arranged to terminate the deceleration slip control of the lock-up clutch when the engine speed has been lowered to a level close to the idling speed, so that the amount of decrease of the negative drive force immediately after the termination of the deceleration slip control is considerably smaller, even when the braking system is not in operation, than in the conventional apparatus wherein the negative drive force is rapidly reduced to almost zero. Accordingly, the present arrangement is effective to eliminate a discomfort which would be given to the vehicle operator due to a large amount of decrease of the negative drive force immediately after the termination of the deceleration slip control of the lock-up clutch.

The object indicated above may also be achieved according to a third aspect of this invention, which provides an apparatus for controlling a slip speed of a lock-up clutch interposed between an engine and an automatic transmission of a motor vehicle for direct connection therebetween, the apparatus having an optionally activated device and including slip control means capable of effecting a deceleration slip control of the lock-up clutch during deceleration of the motor vehicle such that a difference between a rotating speed of the engine and a rotating speed of an input shaft of the automatic transmission is controlled as the slip speed, the apparatus comprising: (1) optional-device operation detecting means for detecting an operation of the optionally activated device; and (2) deceleration slip control terminating means for substantially terminating the deceleration slip control of the lock-up clutch by the slip control means when the rotating speed of the input shaft of the automatic transmission has been lowered to a threshold value which is determined depending upon an output of the optional-device operation detecting means, such that the threshold value is larger when the optionally activated device is in operation than when the optionally activated device is not in operation.

In the slip control apparatus constructed as described above according to the third aspect of this invention, an operation of the optionally activated device such as an air conditioner is detected by the optional-device operation detecting means, and the deceleration slip control of the lock-up clutch by the slip control means is substantially terminated by the deceleration slip control terminating means when the input shaft speed of the transmission has been lowered to the predetermined threshold value. This threshold value is higher when the optionally activated device is in operation than when the braking system is not in operation. According to this arrangement, the effect of the input shaft speed of the transmission to raise the speed of the engine is reduced when the input shaft speed is comparatively high when the optionally activated device is in operation. In other words, when the optionally activated device is operated, the deceleration slip control of the lock-up clutch is substantially terminated when the input shaft speed of the transmission is sufficiently higher than the idling speed of the engine, which is raised by a given amount from the normal level when the optionally activated device is in operation. Consequently, the engine speed immediately after the termination of the deceleration slip control of the lock-up clutch is prevented from being lowered from the idling speed which is raised from the normal level during operation of the optionally activated device.

Thus, the present slip control apparatus according to the third aspect of the invention is arranged to prevent a rapid rise of the engine speed to the raised idling speed after the termination of the deceleration slip control of the lock-up clutch. Accordingly, the present arrangement is effective to eliminate a discomfort which would be given to the vehicle operator due to a rapid rise of the engine speed immediately after the termination of the deceleration slip control of the lock-up clutch.

In one preferred form of the first, second or third aspect of the present invention, the slip control apparatus further comprises: fuel-cut control device for cutting a fuel supply to the engine during the deceleration slip control of the lock-up clutch by the slip control means; and fuel-cut control terminating means for terminating an operation of the fuel-cut control device to resume the fuel supply to the engine when the deceleration slip control of the lock-up clutch is terminated by the deceleration slip control terminating means. This arrangement is effective to prevent a rapid rise of the engine speed immediately after the termination of the deceleration slip control of the lock-up clutch, and assure improved stability of running of the vehicle.

In another preferred form of the invention, the slip control means controls the slip speed of the lock-up clutch such that an actual value of the slip speed coincides with a target value of the slip speed, and the slip control apparatus further comprises target slip speed changing means for changing the target value of the slip speed such that the target value increases with a decrease of the rotating speed of the input shaft of the automatic transmission. According to this arrangement, the actual slip speed of the lock-up clutch is increased as the input shaft speed of the transmission is lowered during the deceleration slip control of the lock-up clutch, so that the negative drive force of the vehicle is slowly reduced, and then the deceleration slip control is terminated, whereby the amount of decrease of the negative drive force immediately after the termination of the deceleration slip control is significantly reduced.

In a further preferred form of the invention, the slip control apparatus further comprises terminating speed determining means for determining the threshold value of the rotating speed of the input shaft of the automatic transmission such that the threshold value is larger when the speed ratio of the currently established operating position of the automatic transmission is comparatively high than when the speed ratio is comparatively low, or when the braking system is not in operation than when the braking system is in operation, or when the optionally activated device is in operation than when the optionally activated device is not in operation. In this form of the invention, the deceleration slip control terminating means terminates the deceleration slip control of the lock-up clutch when the input shaft speed of the transmission has been lowered to the threshold value which is determined by the terminating speed determining means as described above. This arrangement permits the termination of the deceleration slip control of the lock-up clutch at the relatively high input shaft speed of the transmission when the transmission is placed in the position whose speed ratio is relatively high, or when the braking system is not in operation or when the optionally activated device is in operation.

According to a preferred form of the first aspect of this invention, the slip control means controls the slip speed of the lock-up clutch such that an actual value of the slip speed coincides with a target value of the slip speed, and the slip control apparatus further comprises: target slip speed determining means for determining the target value such that the target value is larger when the speed ratio of the currently established operating position of the automatic transmission is comparatively high than when the speed ratio is comparatively low; and target slip speed changing means for changing the target value of the slip speed such that the target value increases with a decrease of the rotating speed of the input shaft of the automatic transmission. In this arrangement, the deceleration slip control of the lock-up clutch is substantially terminated at the relatively high input shaft speed when the speed ratio of the currently established position of the transmission is relatively high. That is, the input shaft speed of the transmission at which the engine speed has been lowered down to the predetermined fuel-cut speed is higher when the speed ratio of the currently established position of the transmission is comparatively high than when it is comparatively low, In other words, the input shaft speed of the transmission at which the effect of the deceleration slip control of the lock-up clutch to raise the engine speed has been zeroed is higher when the transmission is placed in a position whose speed ratio is comparatively high than when the transmission is placed in a position whose speed ratio is comparatively low. In this arrangement, the deceleration slip control of the lock-up clutch is substantially terminated at the comparatively high input shaft speed of the transmission when the speed ratio of the currently established position is comparatively high.

The slip control apparatus provided with the target slip speed determining means and the target slip speed changing means as described above may be adapted to terminate the deceleration slip control of the lock-up clutch in one of the following cases: when the input shaft speed of the transmission has been lowered to the threshold value determined by terminating speed determining means as described above; and when the engine speed has been lowered to a predetermined fuel-cut speed below which the operation of a fuel-cut control device as described above is terminated to resume the fuel supply to the engine.

BRIEF DESCRIPTION OF THE DRAWINGS

The above and optional objects, features, advantages and technical and industrial significance of the present application will be better understood by reading the following detailed description of presently preferred embodiments of this invention, when considered in connection with the accompanying drawings, in which:

FIG. 2 is a table indicating a relationship between the operating positions of an automatic transmission connected to the torque converter and the respective combinations of the operating states of solenoid-operated valves of the slip control apparatus;

DETAILED DESCRIPTION OF THE PREFERRED EMBODIMENT

Figure 1:
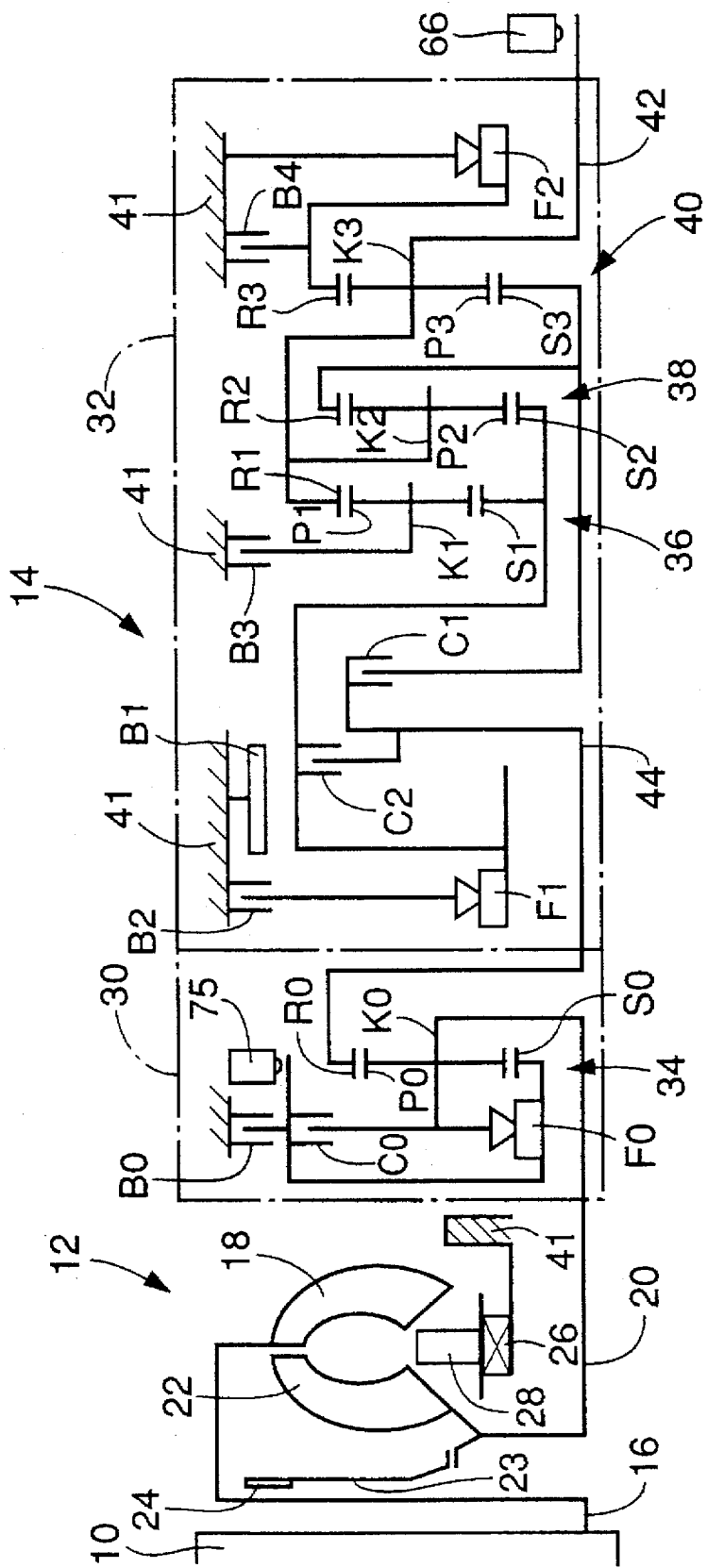
FIG. 1 is a schematic view illustrating a part of a power transmitting system of a motor vehicle, which incorporates a torque converter having a lock-up clutch to be controlled by a slip control apparatus constructed according to one embodiment of the present invention.

Referring first to the schematic view of FIG. 1, there is shown a part of a power transmitting system of a motor vehicle, wherein power generated by an engine 10 is transmitted to an automatic transmission 14 through a torque converter 12 equipped with a lock-up clutch 24, and the power is transferred to drive wheels of the vehicle through a differential gear and a drive axle. The lock-up clutch 24 is controlled by a slip control apparatus constructed according to one embodiment of the present invention, as described below.

The torque converter 12 includes: a pump impeller 18 connected to a crankshaft 16 of the engine 10; a turbine runner 22 fixed to an input shaft of the automatic transmission 14 and rotatable by the pump impeller 18; a stator 28 whose rotation in one direction is inhibited by a one-way clutch 26; and the above-indicated lock-up clutch 24 connected to the input shaft 20 through the turbine runner 22. The pump impeller 18 includes a radially outer portion which is U-shaped in cross section, and a plurality of curved vanes which are arranged in the circumferential direction and formed so as to cause a flow of a working oil, which flow includes a component moving toward the turbine runner 22 on the side of the engine 10. The turbine runner 22 includes a plurality of curved vanes opposed to the vanes of the pump impeller 18. In operation of the torque converter 12, the turbine runner 22 is rotated by the oil flow from the vanes of the pump impeller 18 rotated by the engine 10. The lock-up clutch has a piston 23 which engages a hub of the turbine runner 22 such that the piston 23 is axially slidable relative to and rotatable with the turbine runner 22.

The automatic transmission 14 includes a first transmission unit 30 having a high-gear position and a low-gear position, and a second transmission unit 32 having a rear-drive position and four forward-drive positions. The first transmission unit 30 has a high-low planetary gear set 34, a clutch C0, a one-way clutch F0, and a brake B0. The high-low planetary gear set 34 includes a sung gear S0, a ring gear R0, a carrier K0, and a planetary gear P0 which is rotatably supported by the carrier K0 and which meshes with the sun gear S0 and the ring gear R0. The clutch C0 and the one-way clutch F0 are provided between the sun gear S0 and the carrier K0. The brake B0 is provided between the sun gear S0 and a housing 41 of the automatic transmission 14.

The second transmission unit 32 includes a first planetary gear set 36, a second planetary gear set 38, and a third planetary gear set 40. The first planetary gear set 36 includes a sung gear S1, a ring gear R1, a carrier K1, and a planetary gear P1 which is rotatably supported by the carrier K1 and which meshes with the sun and ring gears S1, R1. The second planetary gear set 38 includes a sun gear S2, a ring gear R2, a carrier K2, and a planetary gear P2 which is rotatably supported by the carrier K2 and which meshes with the sun and ring gears S2, R2. The third planetary gear set 40 includes a sun gear S3, a ring gear R3, a carrier K3, and a planetary gear P3 which is rotatably supported by the carrier K3 and which meshes with the sun and ring gears S3, R3.

The sun gear S1 and the sun gear S2 are integrally connected to each other, while the ring gear R1, carrier K2 and carrier K3 are integrally connected to each other. The carrier K3 of the third planetary gear set 40 is connected to an output shaft 42 of the automatic transmission 14. Further, the ring gear R2 and the sun gear S3 are integrally connected to each other, and a clutch C1 is provided between the series connection of the ring and sun gears R2, S3 and an intermediate shaft 44 of the automatic transmission 14. A clutch C2 is provided between the series connection of the sun gears S1, S2 and the intermediate shaft 44. A band-type brake B1 is fixed to the housing 41, for inhibiting the rotation of the sun gears S1, S2, while a one-way clutch F1 and a brake B2 are provided in series connection with each other between the series connection of the sun gears S1, S2 and the housing 41. The one-way clutch F1 is adapted to be engaged when the sun gears S1, S2 are rotated in a direction opposite to the direction of rotation of the input shaft 20.

A brake B3 is provided between the carrier K1 and the housing 41. A brake B4 and a one-way clutch clutch F2 are provided in parallel between the ring gear R3 and the housing 41. The one-way clutch F2 is adapted to be engaged when the ring gear R3 is rotated in the reverse direction.

The automatic transmission 14 constructed as described above has one rear-drive position and five forward-drive positions which have different speed ratios I (the rotating speed of the input shaft 20 divided by the rotating speed of the output shaft 42), as indicated in the table of FIG. 2, wherein those positions are indicated as "R" (reverse), "1st" (first-speed), "2nd" (second-speed), "3rd" (third-speed), "4th" (fourth-speed), and "5th" (fifth speed). In FIG. 2, "o" indicates the energized state of solenoid-operated valves S1, S2, S3, S4 and linear solenoid valves SLU, SLT and SLN or the engaged state of the clutches C0–C2 and brakes B0–B4, while "x" indicates the de-energized state of the valves or the released state of the clutches and brakes. It will be understood from the table of FIG. 2 that the brake B2 is engaged when the automatic transmission 14 is shifted from the first-speed position "1st" to the second-speed position "2nd", and is released when the transmission 14 is shifted from the second-speed position to the third-speed position "3rd". Further, the brake B2 is engaged when the transmission 14 is shifted from the second-speed position to the third-speed position. The speed ratios I of the five forward-drive positions "1st", "2nd", "3rd", "4th" and "5th" decrease in this order of description.

It is to be noted that the lower halves of the torque converter 12 and the automatic transmission 14 are not shown in FIG. 1 in the interest of simplification, since these elements 12, 14 are symmetrical with respect to their axes of rotation.

Figure 3:
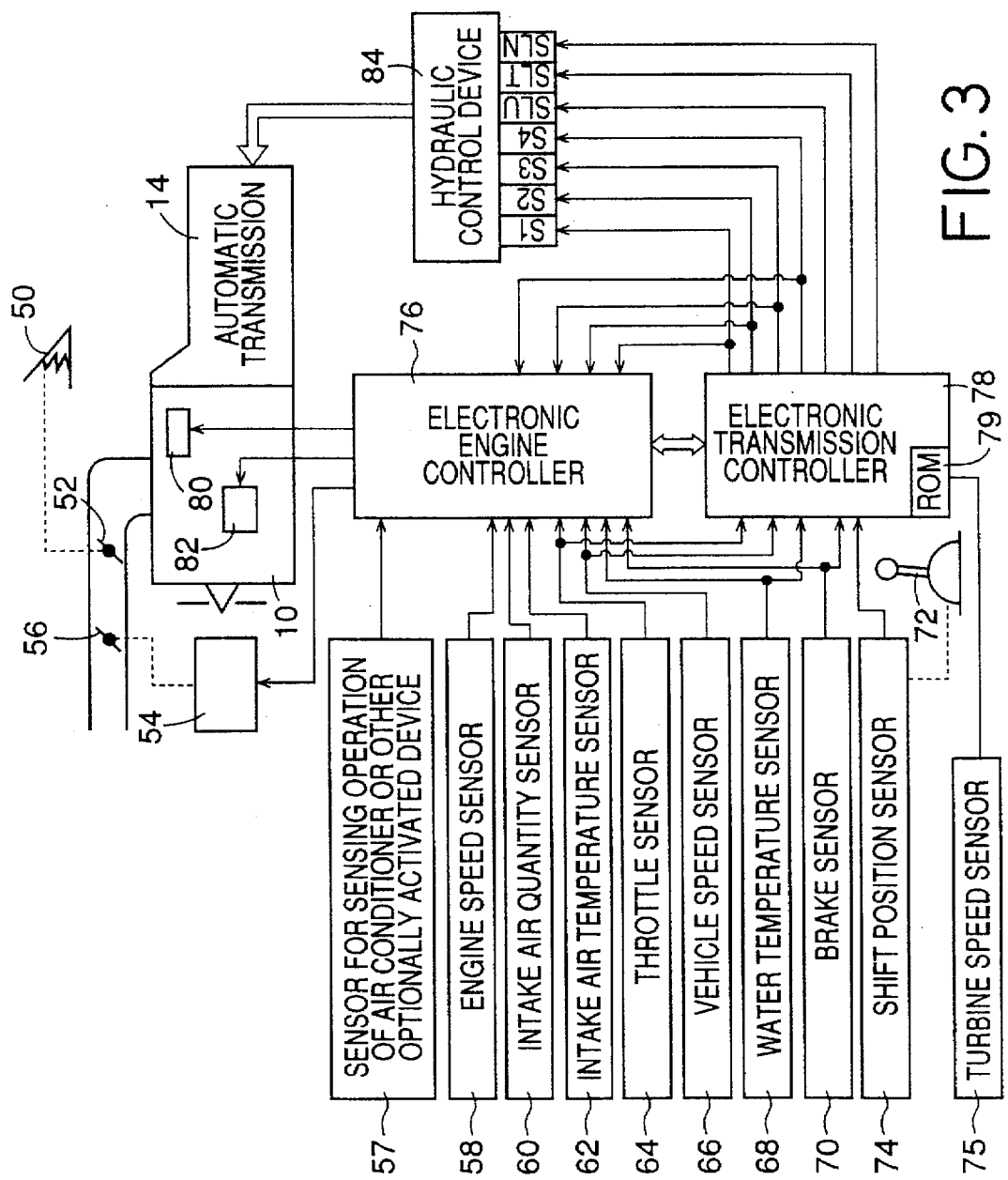
FIG. 3 is a block diagram showing a control system for the motor vehicle, which includes a transmission controller which constitutes a major portion of the slip control apparatus for the lock-up clutch.

Referring next to FIG. 3, there are shown a first throttle valve 52 and a second throttle valve 56 which are disposed in an intake pipe of the engine 10. The first throttle valve 52 is operated by an accelerator pedal 50, while the second throttle valve 56 is operated by a throttle actuator 54. The engine 10 is controlled by an electronic engine controller 76, while the automatic transmission 14 and the lock-up clutch 24 are controlled by an electronic transmission controller 78. These controllers 76, 78 are adapted to receive output signals of various sensors including: an optional-device sensor 57 for detecting an operation of an air conditioner or other optionally or selectively activated device; an engine speed sensor 58 for detecting a speed Ne of the engine 10, namely, the rotating speed of the pump impeller 18; an intake air quantity sensor 60 for detecting a quantity Q of an intake air sucked into the engine 10 through the intake pipe; an intake air temperature sensor 62 for detecting a temperature THa of the intake air; a throttle sensor 64 for detecting an opening angle TA of the first throttle valve 52; a vehicle speed sensor 66 for detecting a rotating speed No of the output shaft 42 of the automatic transmission 14 for calculating a running speed V of the motor vehicle; a water temperature sensor 68 for detecting a temperature THw of a coolant water of the engine 10; a brake sensor 70 for detecting an operating state BK of a brake pedal; and a shift position sensor 74 for detecting a currently selected operating position Psh of a shift lever 72. The output signals of those sensors are applied directly or indirectly to the engine and transmission controllers 76, 78. The transmission controller 78 is adapted to receive also an output signal of a turbine speed sensor 75 indicative of a rotating speed $N_T$ of the turbine runner 22. The two controllers 76, 78 are connected to each other by a communication interface, for applying the necessary signals to each other.

The engine controller 76 is comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the engine 10, more specifically, for effecting a fuel injection control for controlling a fuel injection valve 80 so as to optimize the combustion condition of the engine 10, an ignition control for controlling an ignitor 82 so as to optimize the ignition timing, an engine idling speed control for controlling a suitable by-pass valve to control the idling speed of the engine 10, a traction control for controlling the second throttle valve 56 via the throttle actuator 54 so as to control the traction force of the vehicle drive wheels while preventing slipping of the drive wheels on the road surface, and a fuel-cut control for holding the fuel injection valve 80 closed to cut a fuel supply to the engine 10 while the engine speed Ne is higher than a predetermined fuel-cut threshold level $N_{CUT}$ during coasting of the vehicle, so that the fuel economy of the vehicle is improved. The vehicle is considered to be in a coasting state while the first throttle valve 52 is fully closed. The closure of the first throttle valve 52 may be detected by an idling position switch incorporated in the throttle sensor 64.

The transmission controller 78 is also comprised of a so-called microcomputer incorporating a central processing unit (CPU), a read-only memory (ROM), a random-access memory (RAM) and an interface. The CPU processes the input signals according to various control programs stored in the ROM, while utilizing a temporary data storage function of the RAM, for controlling the automatic transmission 14 and the lock-up clutch 24 via a hydraulic control device 84 by controlling the solenoid-operated valves S1, S2, S3 and S4 and the linear solenoid valves SLU, SLN and SLU. For instance, the transmission controller 78 is adapted to control: the linear solenoid valve SLT to produce an output pressure $P_{SLT}$ corresponding to the opening angle TA of the first throttle valve 52; the linear solenoid valve SLN to regulate an accumulator back pressure; and the linear solenoid valve SLU for fully engaging the lock-up clutch 24 or controlling an actual slip speed Nslip of the lock-up clutch 24. The slip speed Nslip is equal to a difference ($Ne-N_T$) between the speed Ne of the engine 10 and the speed $N_T$ of the turbine runner 22. The transmission controller 78 is adapted to select one of the operating positions of the automatic transmission 14 and the engaging state (fully or partially engaging state) of the lock-up clutch 24, on the basis of the opening angle TA of the first throttle valve 52 and the vehicle speed V (calculated from the detected output shaft speed No), and according to predetermined shift patterns (shift boundary lines) stored in the ROM. The transmission controller 78 controls the solenoid-operated valves S1, S2, S3 to as to establish the selected operating position of the automatic transmission 14 and the selected engaging state of the lock-up clutch 24, and de-energize the solenoid-operated valve S4 when engine brake is applied to the vehicle.

Figure 4:
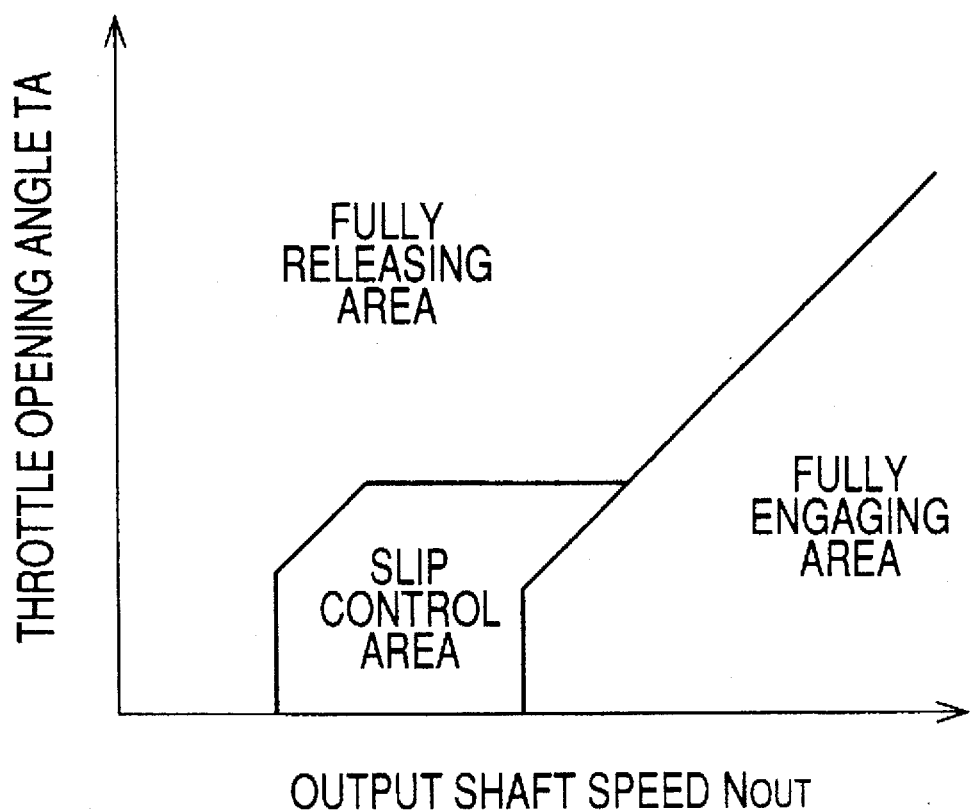
FIG. 4 is a view indicating boundaries defining different control areas of the lock-up clutch in relation to the running condition of the vehicle, which boundaries are stored in the slip control apparatus shown in FIG. 3.

The transmission controller 78 controls the lock-up clutch 24 so as to be fully released while the automatic transmission 14 is placed in the first-speed or second-speed position "1st" or "2nd", and so as to be fully released, partially engaged or fully engaged while the automatic transmission 14 is placed in the third-speed or fourth-speed position "3rd" or "4th". For controlling the lock-up clutch 24 differently depending upon the running condition of the vehicle with the transmission 14 placed in the third- or fourth-speed position, predetermined boundaries defining three different control areas as indicated in FIG. 4 are stored in the ROM 79 (indicated in FIG. 3) of the transmission controller 78. For instance, the boundaries are relationships between the opening angle TA of the first throttle valve 52 and the rotating speed No of the output shaft 42 of the transmission 14 (vehicle running speed V). Described more specifically, these boundaries define a fully releasing area in which the lock-up clutch 24 should be fully released, a fully engaging area in which the lock-up clutch 24 should be fully engaged, and a slip control area in which the slip speed $N_{SLIP}$ of the lock-up clutch 24 should be suitably controlled, that is, the slip control of the lock-up clutch 24 is executed by the transmission controller 78. Depending upon the currently detected throttle opening TA and the output shaft speed No, one of the three control areas is determined or selected by the CPU of the controller 78, according to the boundaries stored in the ROM 79.

When the vehicle running condition (TA and No) is in the slip control area of FIG. 4, for example, the lock-up clutch 24 is controlled to be held in a partially slipping state for transmitting power of the engine 10 to the automatic transmission 14 while absorbing a torque variation of the engine 10 and minimizing power loss at the torque converter 12, so as to maximize the fuel economy of the vehicle without deteriorating the drivability of the vehicle. The slip speed Nslip of the lock-up clutch 24 is also controlled while the vehicle is coasting or decelerating with the throttle valve 52 placed in the idling position. This slip control during deceleration of the vehicle is effected to increase an effect of the fuel-cut control of the engine 10 with the engine speed Ne held above the predetermined fuel-cut threshold level $N_{CUT}$. In this case, however, the slip control area is determined on the basis of only the vehicle speed V (output shaft speed No), since the throttle opening angle TA is zero during the coasting of the vehicle.

If the CPU of the controller 78 determines that the vehicle running condition falls in the slip control area, a suitable slip control routine is executed to calculate the actual slip speed Nslip of the lock-up clutch 24, and calculate a desired SLIP CONTROL current $I_{SLU}$ to be applied to the linear solenoid valve SLU so as to eliminate a control error $\Delta E=Nslip-NslipT$, which error is equal to the actual slip speed Nslip minus a predetermined target slip speed NslipT, so that the actual slip speed Nslip coincides with the target value NslipT. The desired SLIP CONTROL current $I_{SLU}$ is expressed as a desired duty ratio $D_{SLU}$ (%) of the linear solenoid valve SLU, which may be calculated according to the following equation (1) (which has been described above):

$$DSLU=DFWD+DFB+KGD \tag{1}$$

The first term DFWD of the right member of the above equation (1) is a feed-forward control value which varies as a function of the output torque of the engine 10, for example. The third term KGD is a learning control valve which changes so as to reflect the changing characteristics of the lock-up clutch 24, for example. The second term DFB is a feedback control value for zeroing the control error $\Delta E=Nslip-NslipT$. The control values DFWD and DFB are percent (%) values obtained by conversion into the corresponding duty ratio values. The feedback control value DFB is calculated according to the following PID equation well known in the art:

$$DFB=K_p[\Delta E+1/TI)\int \Delta E dt+T_D(d\Delta E/dt)] \tag{2}$$

In the above equation (2), Kp represents a proportional gain, and TI and TD represent an integration and differentiation times, respectively.

With the duty ratio $D_{SLU}$ calculated as described above, a SLIP CONTROL pilot pressure $P_{SLU}$ to be produced by the linear solenoid valve SLU is accordingly adjusted so as to control the lock-up clutch 24 in the slip control mode.

Figure 5:
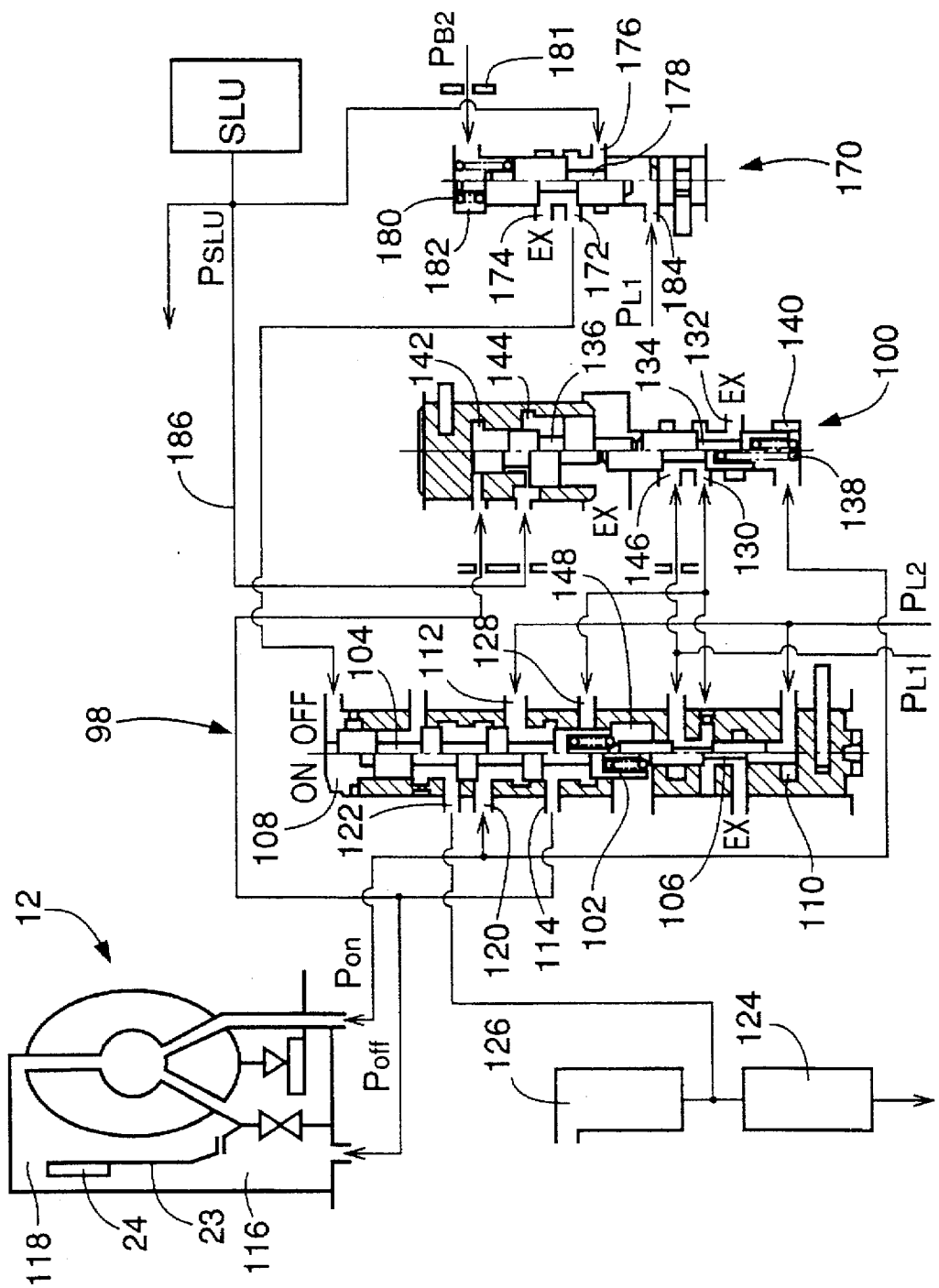
FIG. 5 is a view illustrating a part of a hydraulic control device shown in FIG. 3, which incorporates a circuit for controlling the lock-up clutch.
Figure 6:
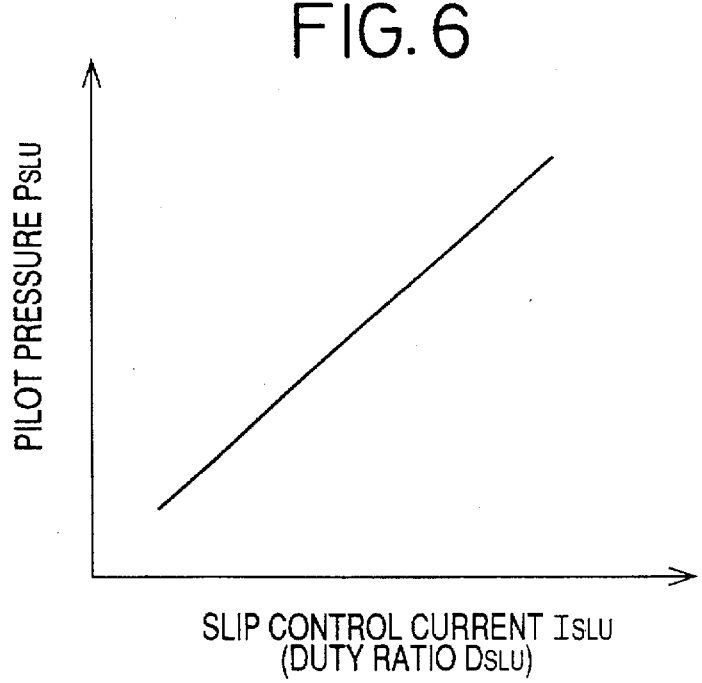
FIG. 6 is a graph indicating an output characteristic of a linear solenoid valve provided in the lock-up clutch control circuit of FIG. 5.

Referring to FIG. 5, there is shown a part of the hydraulic control device 84 which includes the linear solenoid valve SLU which produces the pilot $P_{SLU}$. The linear solenoid valve SLU is a pressure reducing valve whose output pressure $P_{SLU}$ (pilot pressure) increases with an increase in the SLIP CONTROL current $I_{SLU}$, as indicated in the graph of FIG. 6. The duty ratio $D_{SLU}$ of the SLIP CONTROL current $I_{SLU}$ is controlled by the transmission controller 78. The SLIP CONTROL pilot pressure $P_{SLU}$ produced by the linear solenoid valve SLU is applied to a lock-up clutch relay valve 98 and a lock-up clutch control valve 100, which are also included in the hydraulic control device 84.

The lock-up clutch relay valve 98 has: a first spool 104 and a second spool 106; a spring 102 disposed between the first and second spools 104, 106; an oil chamber 108 provided to receive the pilot pressure $P_{SLU}$ for biasing the first and second spools 104, 106 toward an "ON" position corresponding to the fully engaged state of the lock-up clutch 24; and an oil chamber 110 provided to receive a second line pressure $P_{L2}$ for biasing the first and second spools 102, 104 toward an "OFF" position corresponding to the fully released state of the lock-up clutch 24.

When the first spool 104 is placed in the OFF position, the second line pressure $P_{L2}$ applied to an input port 112 is applied to a releasing oil chamber 116 of the torque converter 12 through a releasing port 114, while the working oil is fed out of an engaging oil chamber 118 of the torque converter 12 through a drain port 122 and discharged into a cooler by-pass valve 124 or an oil cooler 126, whereby an engaging pressure of the lock-up clutch 24 is lowered. The engaging pressure of the lock-up clutch 24 is equal to a difference between the pressures in the pressures in the engaging and releasing oil chambers 118, 116, more specifically, the pressure $P_{on}$ in the engaging oil chamber 118 minus the pressure $P_{off}$ in the releasing oil chamber 116. When the first spool 104 is placed in the ON position, on the other hand, the second line pressure $P_{L2}$ applied to the input port 112 is applied to the engaging oil chamber 118 through an engaging port 120, while the oil is discharged from the releasing oil chamber 116 through a drain port 128 of the relay valve 98 and through a control port 130 and a drain port 132 of the lock-up clutch control valve 100, whereby the engaging pressure ($P_{on}$–$P_{off}$) of the lock-up clutch 24 is raised.

When the SLIP CONTROL pilot pressure $P_{SLU}$ is lower than a predetermined threshold $\beta$, the first spool 104 is placed in the OFF position (indicated on the right side of the centerline of the valve 98 in FIG. 5) by a thrust force based on the biasing force of the spring 102 and the second line pressure $P_{L2}$, so that the lock-up clutch is fully released. When the pilot pressure $P_{SLU}$ is higher than a predetermined threshold $\alpha$, the first spool 104 is placed in the ON position (indicated on the left side of the centerline of the valve 98 in FIG. 5) by a thrust force based on the pilot pressure $P_{SLU}$, so that the lock-up clutch 24 is fully or partially engaged. That is, the pressure-receiving areas of the first and second spools 104, 106 and the biasing force of the spring 102 are determined so that the first spool 104 is placed in the OFF and ON positions when the pilot pressure $P_{SLU}$ is lower and higher than the threshold values $\beta$ and $\alpha$, respectively. The amount of slip of the lock-up clutch 24 with the spool 104 or relay valve 98 being placed in the ON position is controlled by the lock-up clutch control valve 100 which is operated depending upon the pilot pressure $P_{SLU}$.

The lock-up clutch control valve 100 is provided to fully engage the lock-up clutch 24 or control the slip amount $N_{SLIP}$ of the lock-up clutch 24 according to the received pilot pressure $P_{SLU}$ when the lock-up clutch relay valve 98 is placed in the ON position. The control valve 100 has: a spool 134; a plunger 136 in abutting contact with the spool 134, for biasing the spool 134 toward a discharge position thereof (indicated on the right side of the centerline of the valve 100 in FIG. 5); a spring 138 for biasing the spool 134 toward a supply position thereof (indicated on the left side of the centerline of the valve 100 in FIG. 5); an oil chamber 140 in which the spring 138 is accommodated and which is provided to receive the pressure $P_{on}$ in the engaging oil chamber 118 of the torque converter 12, for biasing the spool 134 toward the supply position; an oil chamber 142 which is partially defined by one end of the plunger 136 and which is provided to receive the pressure $P_{off}$ in the releasing oil chamber 116 of the torque converter 12, for biasing the spool 134 toward the discharge position; and an oil chamber 144 provided in an axially intermediate portion of the plunger 136, to receive the SLIP CONTROL pilot pressure $P_{SLU}$ from the linear solenoid valve SLU.

When the spool 134 is placed in the discharge position, a control port 130 and a drain port 132 of the control valve 100 communicate with each other, resulting in an increase in the engaging pressure ($P_{on}$–$P_{off}$) of the lock-up clutch 24, causing an increase in the engaging torque of the lock-up clutch 24. When the spool 134 is placed in the supply position, the control port 130 is brought into communication with a supply port 146 by a first line pressure $P_{L1}$ applied thereto, so that the first line pressure $P_{L1}$ is applied to the releasing oil chamber 116, whereby the engaging pressure of the lock-up clutch 24 is lowered, resulting in a decrease in the engaging torque of the lock-up clutch 24.

Figure 7:
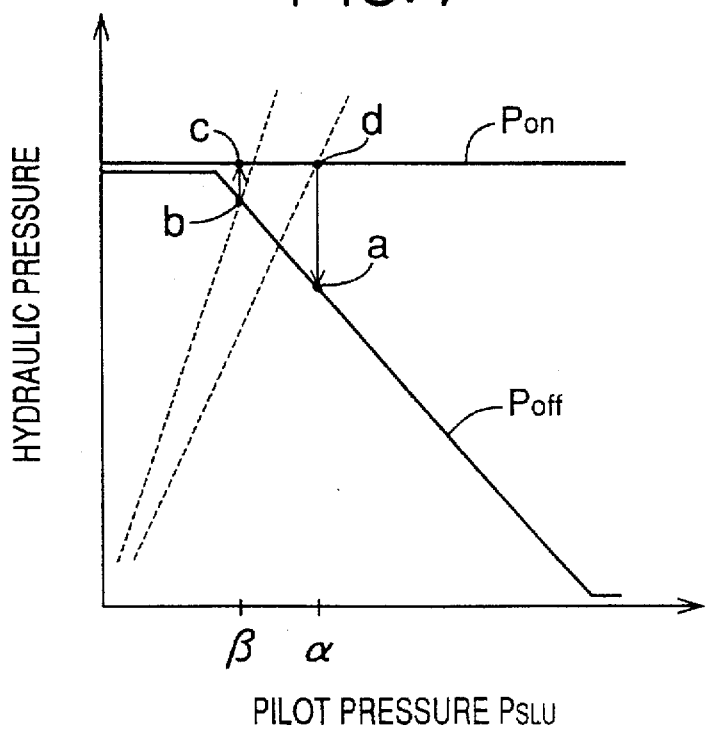
FIG. 7 is a graph indicating an output characteristic of a lock-up clutch control valve provided in the lock-up clutch control circuit of FIG. 5, namely, a relationship between a pilot pressure $P_{SLU}$ received by the lock-up clutch control valve and pressures in engaging and releasing oil chambers of the lock-up clutch.

To fully release the lock-up clutch 24, the transmission controller 78 controls the linear solenoid valve SLU so as to reduce the pilot pressure $P_{SLU}$ to be lower than the threshold $\beta$. To fully engage the lock-up clutch 24, the transmission controller 78 controls the linear solenoid valve SLU so as to increase the pilot pressure $P_{SLU}$ to the highest level. The amount of slip of the lock-up clutch 24 is controlled by controlling the pilot pressure $P_{SLU}$ between the threshold level $\beta$ and the highest level indicated above. Namely, the lock-up clutch control valve 100 is adapted to change the pressures $P_{on}$ and $P_{off}$ in the engaging and releasing oil chambers 118, 116 of the torque converter 12, according to the pilot pressure $P_{SLU}$ received from the linear solenoid valve SLU, as indicated in the graph of FIG. 7, so that the engaging torque and the resulting slip amount of the lock-up clutch 24 are controlled according to the pressure difference $P_{on}$–$P_{off}$ which is referred to as the "engaging pressure" of the lock-up clutch 24. In other words, the engaging torque and slip amount of the lock-up clutch 24 vary as a function of the pressure difference $P_{on}$–$P_{off}$ which varies with the SLIP CONTROL pilot pressure $P_{SLU}$. It is noted that the slip amount of the lock-up clutch 24 is equal to the absolute value of the slip speed Nslip. When the value of the slip speed Nslip is positive, the engine speed Ne is higher than the turbine runner speed $N_T$. When the value of the slip speed Nslip is negative, the engine speed NE is lower than the turbine runner speed $N_T$.

In the graph of FIG. 7, a left-hand side one of two dashed lines indicates a hydraulic characteristic of the lock-up clutch relay valve 98 required for the first spool 104 to be shifted from the ON position to the OFF position to fully release the lock-up clutch 24, while the other right-hand side dashed line indicates a hydraulic characteristic of the relay valve 98 required for the first spool 104 to be shifted from the OFF position to the ON position to fully or partially engage the lock-up clutch 24. The gradients of these dashed lines are determined by the pressure-receiving areas of the first and second spools 104, 106, the pressure inputs to the relay valve 98 and the characteristic of the spring 102.

The oil chamber 108 of the lock-up clutch relay valve 98 is connected to a solenoid relay valve 170. This solenoid relay valve 170 has: an output port 172 connected to the oil chamber 108 of the relay valve 98; a drain port 174; a an input port 176 provided to receive the SLIP CONTROL pilot pressure $P_{SLU}$ from the linear solenoid valve SLU; a spool 178 having a first position for fluid communication between the output and drain ports 172, 174, and a second position for fluid communication between the output and input ports 172, 176; a spring 180 for biasing the spool 178 toward the second position; an oil chamber 182 in which the spring 180 is accommodated and which is provided to receive through an orifice 181 a brake B2 pressure in the brake B2 of the transmission 14, for biasing the spool 178 toward the second position; and an oil chamber 184 provided to receive the first line pressure $P_{L1}$ for biasing the spool 178 toward the first position. The brake B2 pressure in the brake B2 is generated when the automatic transmission 14 is placed in the third- fourth- or fifth-speed position "3rd", "4th" or "5th". In this arrangement, the SLIP CONTROL pilot pressure $P_{SLU}$ is applied to the oil chamber 108 of the lock-up clutch relay valve 98, only when the automatic transmission 14 is placed in the third-, fourth- or fifth-speed position, and the first spool 104 is moved to the ON position according to the pilot pressure $P_{SLU}$. Since the second line pressure $P_{L2}$ is obtained by lowering the first line pressure $P_{L1}$, the second line pressure $P_{L2}$ is always lower than the first line pressure $P_{L1}$.

The linear solenoid valve SLU is connected to the oil chamber 144 of the lock-up clutch control valve 100 through an oil passage 186, so that the pilot pressure $P_{SLU}$ may be applied directly to the oil chamber 144 of the control valve 100 without passing through the solenoid relay valve 170. This oil passage 186 is provided to operate the control valve 100 by application of the pilot pressure $P_{SLU}$ thereto, for the purpose of detecting possible abnormality that the lock-up clutch relay valve 98 is kept in the ON position for some reason or other.

Figure 8:
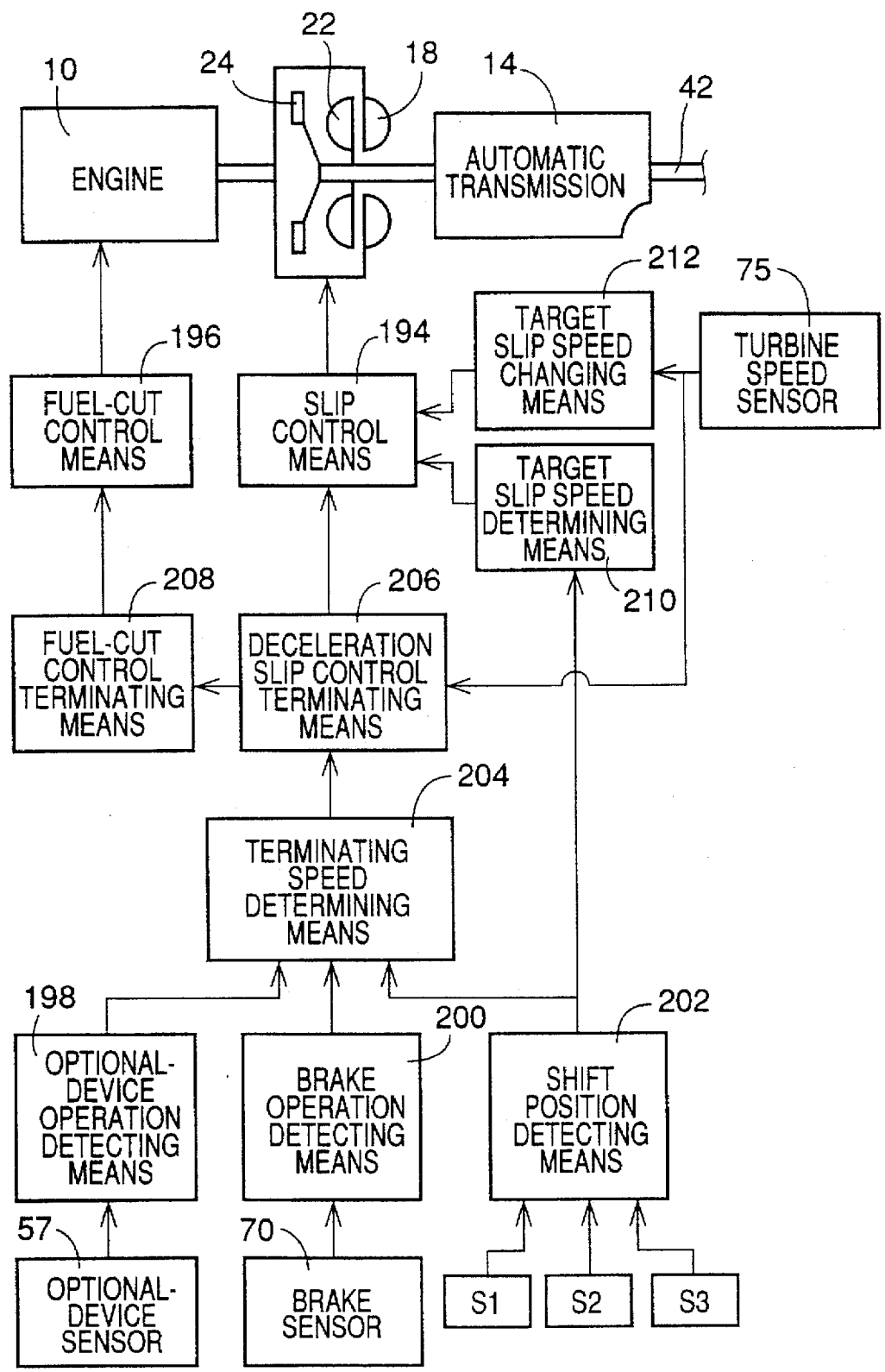
FIG. 8 is a block diagram illustrating the functions of various functional means incorporated in the slip control apparatus.

Referring next to the block diagram of FIG. 8, there will be described the functions of various functional means provided in the slip control apparatus constructed according to the present embodiment of the invention, which apparatus includes the electronic transmission controller 78, optional-device sensor 57, brake sensor 70, and turbine speed sensor 75. That is, the slip control apparatus incorporates slip control means 194, fuel-cut control device 196, optional device operation detecting means 198, brake operation detecting means 200, shift position detecting means 202, terminating speed determining means 204, deceleration slip control terminating means 206, fuel-cut control terminating means 208, target slip speed determining means, and target slip speed changing means 212.

When the vehicle running condition is determined to fall in the slip control area explained above by reference to FIG. 4, the slip control means 194 applies to SLIP CONTROL current $I_{SLU}$ to the linear solenoid valve SLU for operating this valve SLU at the duty ratio $D_{SLU}$ calculated according to the above equation (1), so that the detected actual slip speed Nslip=Ne–$N_T$ of the lock-up clutch 24 coincides with the target slip speed NslipT. While the vehicle is coasting or decelerating with the throttle valve 52 placed in its engine idling position, the slip control means 194 performs a deceleration slip control for controlling the linear solenoid valve SLU according to the above equation (1), as described above, for controlling the lock-up clutch 24 during deceleration of the vehicle.

The fuel-cut control device 196 is adapted to cut a fuel supply to the engine 10 by closing the fuel injection valve 80, depending upon the opening angle TA and the engine speed Ne. The optional-device operation detecting means 198 is adapted to detect an operation of an air conditioner or other optionally activated device (device which is activated when needed), on the basis of an output signal of the optional-device sensor 57. The brake operation detecting means 200 is adapted to detect an operation of the brake pedal (namely, an operation of a braking system of the vehicle), on the basis of an output signal of the brake sensor 70. The shift position detecting means 202 is adapted to detect a currently selected or established operating position of the automatic transmission 14, on the basis of the operating states of the solenoid-operated valves S1, S2, S3.

The terminating speed determining means 204 is operated in response to the outputs of the optional-device operation detecting means, 198, the brake operation detecting means 200 and the shift position detecting means 202. This terminating speed determining means 204 is adapted to change or determine a threshold value of the speed $N_T$ of the input shaft 20 of the automatic transmission 14 (turbine runner 22 of the torque converter 12) at which the deceleration slip control of the lock-up clutch 24 by the slip control means 194 is terminated by the deceleration slip control terminating means 206 The terminating speed determining means 204 determines the threshold value such that the threshold value is larger when the optional device is in operation than when it is not in operation, or when the braking system is not in operation than when it is in operation, or when the currently established or selected position of the automatic transmission 14 has a comparatively high speed ratio than when it has a comparatively low speed ratio. The speed ratio is the ratio of the speed $N_T$ of the input shaft 20 (turbine runner 22) to the speed of the output shaft 30 of the transmission 14.

The deceleration slip control terminating means 206 is adapted to terminate the deceleration slip control of the lock-up clutch 24 and place the lock-up clutch 24 in the fully released state when the speed $N_T$ of the input shaft 20 of the automatic transmission 14 is lowered below the threshold value determined by the terminating speed determining means 204. The fuel-cut control terminating means 208 terminates the fuel cut control of the engine 10 by the fuel-cut control device 196 when the deceleration slip control of the lock-up clutch 24 is terminated by the deceleration slip control terminating means 206. As a result of termination of the fuel cut control, the fuel supply to the engine 10 is resumed, and the engine speed Ne is held at a predetermined idling speed $N_{IDL}$.

The target slip speed determining means 210 determines the target slip speed NslipT of the lock-up clutch 24, depending upon the currently established position of the automatic transmission 14 detected by the shift position detecting means 202, such that the target slip speed NslipT is higher when the speed ratio of the currently established position is comparatively high than when it is comparatively low. The target slip speed changing means 212 changes the target slip speed NslipT depending upon the speed $N_T$ of the input shaft 20 detected by the turbine speed sensor 75 during the deceleration slip control of the lock-up clutch 24, such that the target slip speed NslipT increases with a decrease in the input shaft speed $N_T$. The slip control means 194 controls the SLIP CONTROL pilot pressure $P_{SLU}$ so that the actual slip speed Nslip coincides with the target slip value NslipT which is determined by the target slip speed determining means 210 and changed by the target slip speed changing means 212.

Figure 9:
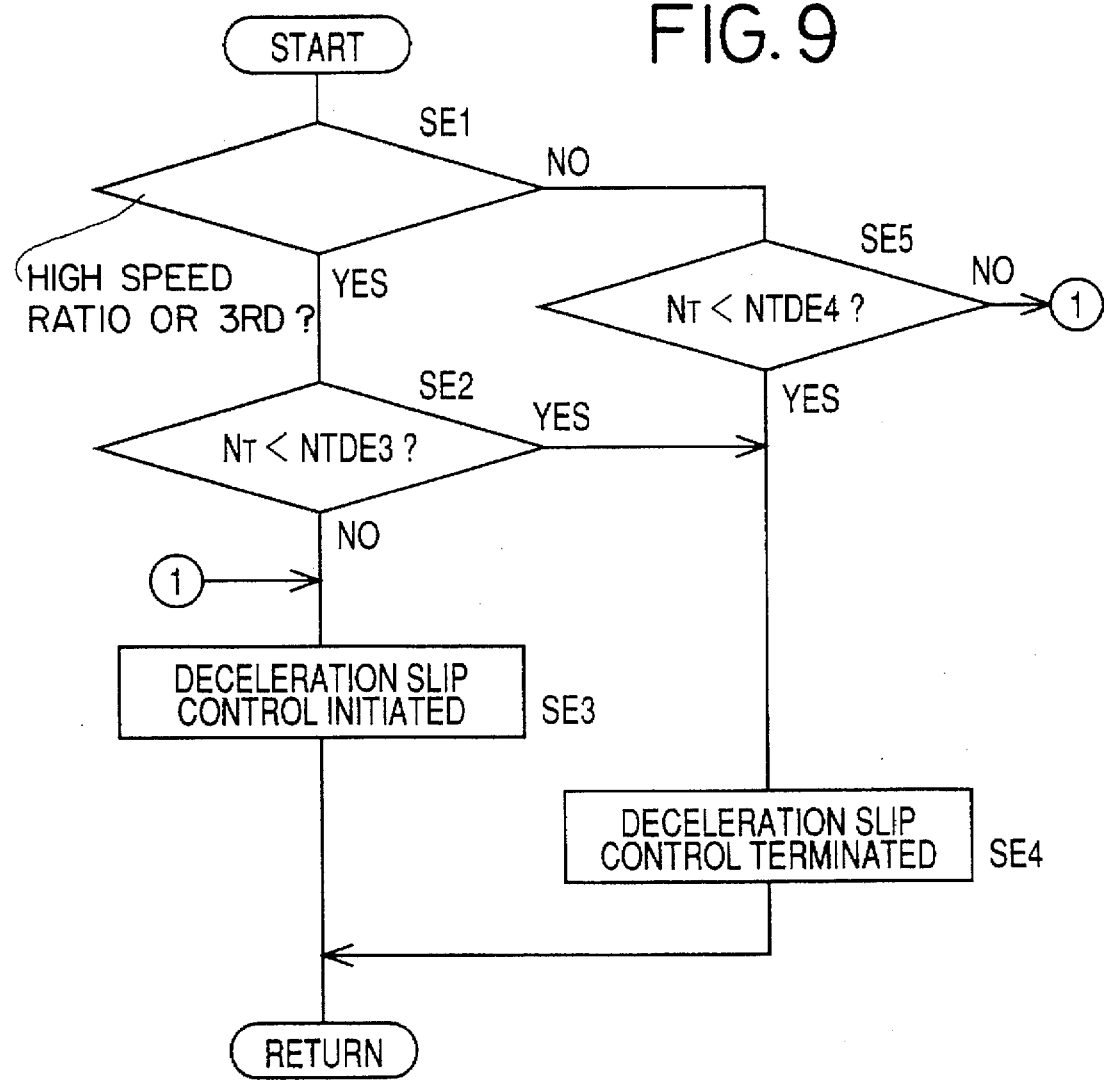
FIG. 9 is a flow chart illustrating a lock-up clutch control routine executed by the transmission controller of FIG. 3, for terminating deceleration slip control of the lock-up clutch at different input speeds of the automatic transmission depending upon the running condition of the vehicle.
Figure 10:
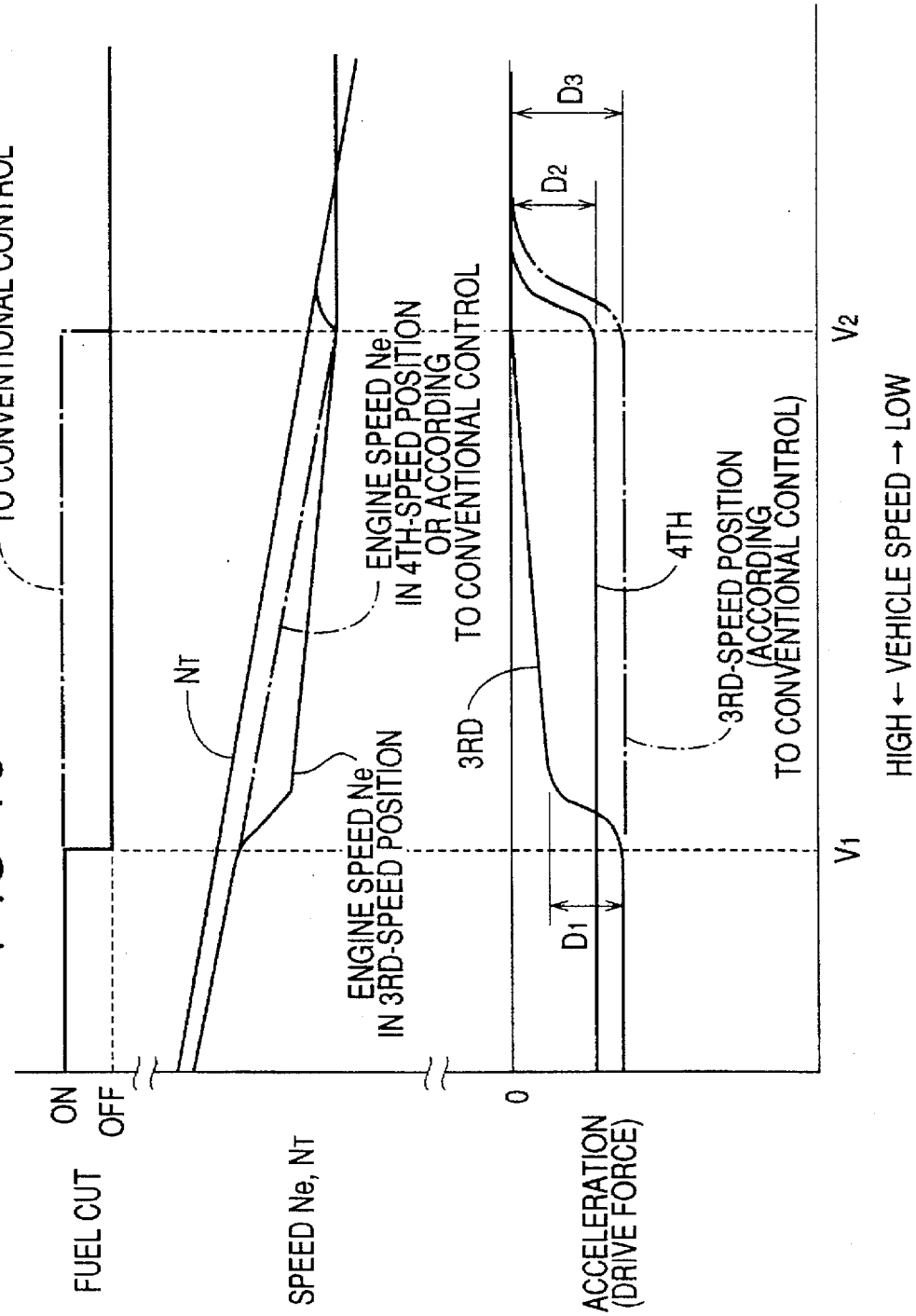
FIG. 10 is a view indicating a relationship among various parameters including the vehicle running speed and the engine speed when the lock-up clutch is controlled according to the control routine of FIG. 9.

Referring to FIGS. 9 and 10, there will be described an operation of the transmission controller 78 including the terminating speed determining means 204 and the deceleration slip control terminating means 206 which are adapted to operate according to a control routine of FIG. 8, such that the deceleration slip control of the lock-up clutch 24 by the slip control means 194 is terminated at different values of the input shaft speed $N_T$ of the automatic transmission 14, depending upon whether the transmission 14 is currently placed in the 3rd-speed position or the fourth-speed position. FIG. 10 indicates a relationship among various parameters including the vehicle running speed V and the engine speed Ne when the deceleration slip control of the lock-up clutch 24 is effected and terminated according to a control routine of FIG. 9.

The control routine of FIG. 9 is initiated with step SE1 corresponding to the shift position detecting means 202, to determine whether the automatic transmission 14 is currently placed in the 3rd-speed position. If an affirmative decision (YES) is obtained in step SE1, the control flow goes to step SE2 to determine whether the input shaft speed $N_T$ of the transmission 14 is lower than a threshold value NTDE3 which is determined by the terminating speed determining means 204 so that this threshold value NTDE3 is used when the transmission 14 is placed in the 3rd-speed position. The threshold value NTDE3 of the input shaft speed $N_T$ is the speed value $N_T$ corresponding to the vehicle running speed V1 indicated in the graph of FIG. 10.

If a negative decision (NO) is obtained in step SE2, it means that the vehicle running speed V is higher than the threshold value V1, and the input shaft speed $N_T$ is not lower than the threshold value NTDE3. That is, the vehicle running condition is in an area to the left of a vertical dashed line in FIG. 10 corresponding to the threshold vehicle speed value V1. In this case, the control flow goes to step SE3 to permit the slip control means 194 to effect or continue the deceleration slip control of the lock-up clutch 24.

When the input shaft speed $N_T$ has been lowered below the threshold value NTDE3 with the vehicle speed V being lowered to V1 during repeated execution of the control routine of FIG. 9, an affirmative decision (YES) is obtained in step SE2, and the control flow goes to step SE4 corresponding to the deceleration slip control terminating means 206, to command the slip control means 194 to terminate the deceleration slip control of the lock-up clutch 24. As a result, the engine speed Ne is lowered at a relatively high rate as indicated in FIG. 10. However, since the input shaft speed $N_T$ is sufficiently higher than the engine idling speed $N_{IDL}$, the speed of the pump impeller 18 of the torque converter 12 is raised by the rotation of the turbine runner 22, which is transmitted to the pump impeller 18 via the working fluid in the torque converter 12. In a period immediately after the termination of the deceleration slip control of the lock-up clutch 24,. therefore, the amount of drop of the engine speed Ne is not so large, that is, the engine speed Ne is lowered to a level which is sufficiently higher than the engine idling speed $N_{IDL}$. The engine speed Ne is subsequently lowered at a relatively low rate down to the idling speed $N_{IDL}$ as the input shaft speed $N_T$ is slowly lowered. Accordingly, the amount of decrease of the negative acceleration (i.e., deceleration) or amount of decrease of the negative drive force given to the vehicle by the engine 10 in the above-indicated period is as small as D1 as indicated in FIG. 10, and the negative acceleration or drive force is not zeroed in that period.

In the graph of FIG. 10, the vehicle speed V1 corresponds to the moment of termination of the deceleration slip control in step SE4, while the vehicle speed V2 corresponds to the moment at which the engine speed Ne has been lowered to the idling speed $N_{IDL}$. When the deceleration slip control of the lock-up clutch 24 is terminated by the terminating means 206, an appropriate signal is generated from the transmission controller 78, and the fuel cut control of the fuel-cut control device 196 is terminated by the fuel-cut control terminating means 208, so that the fuel supply is resumed upon termination of the deceleration slip control of the lock-up clutch 24, that is, at the moment corresponding to the vehicle speed V1, as indicated in FIG. 10.

If the automatic transmission 14 is currently placed in the 4th-speed position, a negative decision (YES) is obtained in step SE1, and the control flow goes to step SE5 to determine whether the input shaft speed $N_T$ of the transmission 14 is lower than a threshold value NTDE4 which is determined by the terminating speed determining means 204 so that this threshold value NTDE4 is used when the transmission 14 is placed in the 4th-speed position. The threshold value NTDE4 is the speed value $N_T$ corresponding to the vehicle running speed V2 indicated in the graph of FIG. 10. The threshold speed value NTDE4 for the 4th-speed position having a relatively low speed ratio is lower than the threshold speed value NTDE3 for the 3rd-speed position having a relatively high speed ratio. The threshold speed value NTDE4 is determined such that the actual engine speed Ne is expected to be equal to a level close to the idling speed $N_{IDL}$ when the input shaft speed $N_T$ has been lowered to the threshold value NTDE4 during the deceleration slip control of the lock-up clutch 24. If a negative decision (NO) is obtained in step SE5, it means that the input shaft speed $N_T$ is still sufficiently high, and the deceleration slip control is still exhibiting an effect of prolonging the fuel cut control of the engine 10. In this case, therefore, the control flow goes to step SE3 to permit the slip control means 194 to continue the deceleration slip control of the lock-up clutch 24.

When the vehicle speed V has been lowered to V2 during repeated execution of the control routine of FIG. 9, that is, when the input shaft speed $N_T$ has been lowered to the threshold value NTDE4, an affirmative decision (YES) is obtained in step SE5, and the control flow goes to step SE4 to command the slip control means 194 to terminate the deceleration slip control of the lock-up clutch 24. At this time, the fuel-cut control means 196 is turned off to terminate the fuel cut control of the engine 10, whereby the fuel supply to the engine 10 is resumed. As a result the engine speed Ne is temporarily raised, and is then slowly lowered down to the idling speed $N_{IDL}$. In this case where the deceleration slip control is terminated with the affirmative decision (YES) being obtained in step SE5, the input shaft speed $N_T$ is lowered to the threshold value NDTE4 close to the engine idling speed $N_{IDL}$ upon termination of the deceleration slip control. Therefore, the amount of subsequent increase of the engine speed Ne by the input shaft speed $N_T$ is zero, and the negative acceleration given to the vehicle by the engine 10 is almost zero. In this case, the amount of change of the negative acceleration (negative drive force) is D2 as indicated in FIG. 10.

It will be understood from the above explanation of the present embodiment that the shift position determining means 202 determines in step SE1 whether the automatic transmission 14 is currently placed in the 3rd-speed position or the 4th-speed position, and the deceleration slip control means 206 terminates the deceleration slip control of the lock-up clutch 24 by the slip control means 194, in step SE4, when the input shaft speed $N_T$ of the transmission 14 is lowered to the relatively large threshold value NTDE3 if the transmission 14 is placed in the 3rd-speed position whose speed ratio or gear ratio is higher than that of the 4th-speed position. That is, when the transmission 14 is placed in the 3rd-speed position having the comparatively high gear ratio, the effect of the input shaft speed $N_T$ to raise the engine speed Ne becomes considerably small even when the input shaft speed $N_T$ is comparatively high. Accordingly, the deceleration slip control of the lock-up clutch 24 is terminated when the input shaft speed $N_T$ is sufficiently higher than the engine idling speed $N_{IDL}$, if the transmission 14 is placed in the 3rd-speed position. According to this arrangement, the rotation of the input shaft 20 rotating at the relatively high speed $N_T$ is transmitted to the engine 10 via the working fluid in the torque converter 12, even after the termination of the deceleration slip control of the lock-up clutch 24, whereby the engine speed Ne is raised from the idling speed $N_{IDL}$, and a considerably large negative drive force is given to the vehicle by the engine 10 to decelerate the vehicle.

As described above, the present slip control apparatus is arranged to terminate the deceleration slip control of the lock-up clutch 24 when the engine speed Ne has been lowered to a level close to the idling speed $N_{IDL}$, so that the amount of decrease of the negative acceleration or drive force immediately after the termination of the deceleration slip control is considerably smaller as indicated at D1 in FIG. 10, even when the transmission 14 is placed in the 3rd-speed position having a comparatively high speed ratio (gear ratio), than in the conventional apparatus wherein the negative acceleration is rapidly reduced to almost zero as indicated by one-dot chain line in FIG. 10, with the amount of decrease of the negative acceleration being equal to D3 which is considerably larger than D2. Accordingly, the present arrangement is effective to eliminate a discomfort which would be given due to a large amount of decrease of the negative acceleration (negative drive force) of the vehicle immediately after the termination of the deceleration slip control of the lock-up clutch. When the transmission 14 is placed in the 4th-speed position, on the other hand, the negative acceleration is smaller than when the transmission 14 is placed in the 3rd-speed position, and therefore the amount of decrease of the negative acceleration is small as indicated at D2, even if the threshold value of the input shaft speed $N_T$ at which the deceleration slip control is terminated is the same as used in the conventional arrangement. Therefore, it is not necessary to raise the threshold value of the input shaft speed $N_T$ for the 4th-speed position. Rather, it is desirable to continue the deceleration slip control with the transmission 14 placed in the 4th-speed position until the engine speed Ne has been lowered to the fuel-cut speed $N_{CUT}$ close to the idling speed $N_{IDL}$, as in the conventional arrangement, for maximizing the fuel economy of the vehicle. The present slip control apparatus permits not only effective elimination of a discomfort upon termination of the deceleration slip control of the lock-up clutch 24 when the transmission 14 is placed in the 3rd-speed position, but also improved fuel economy of the vehicle when the transmission is placed in the 4th-speed position.

Figure 11:
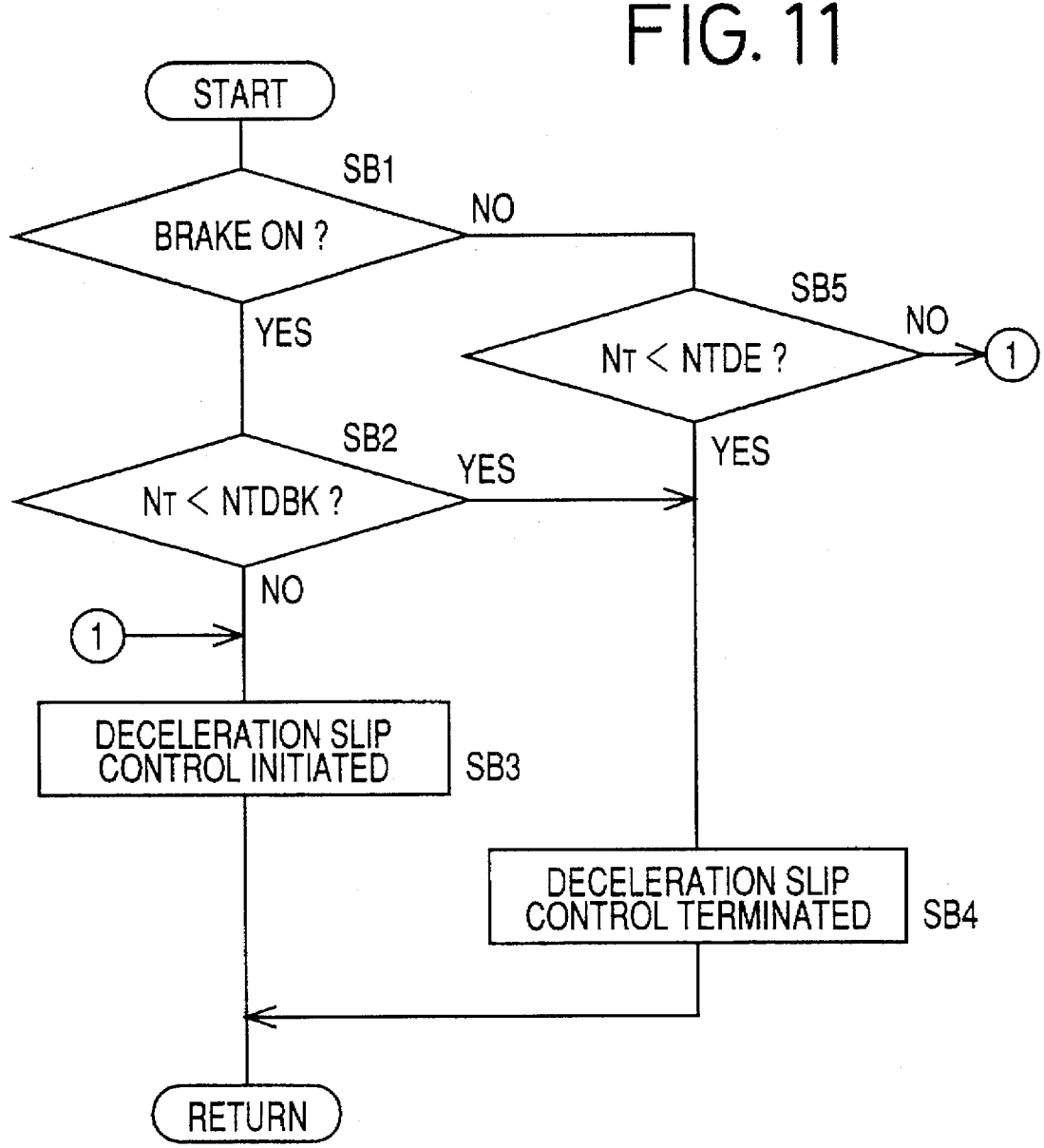
FIG. 11 is a flow chart illustrating a lock-up clutch control routine alternative to that of FIG. 9, according to another embodiment of this invention.
Figure 12:
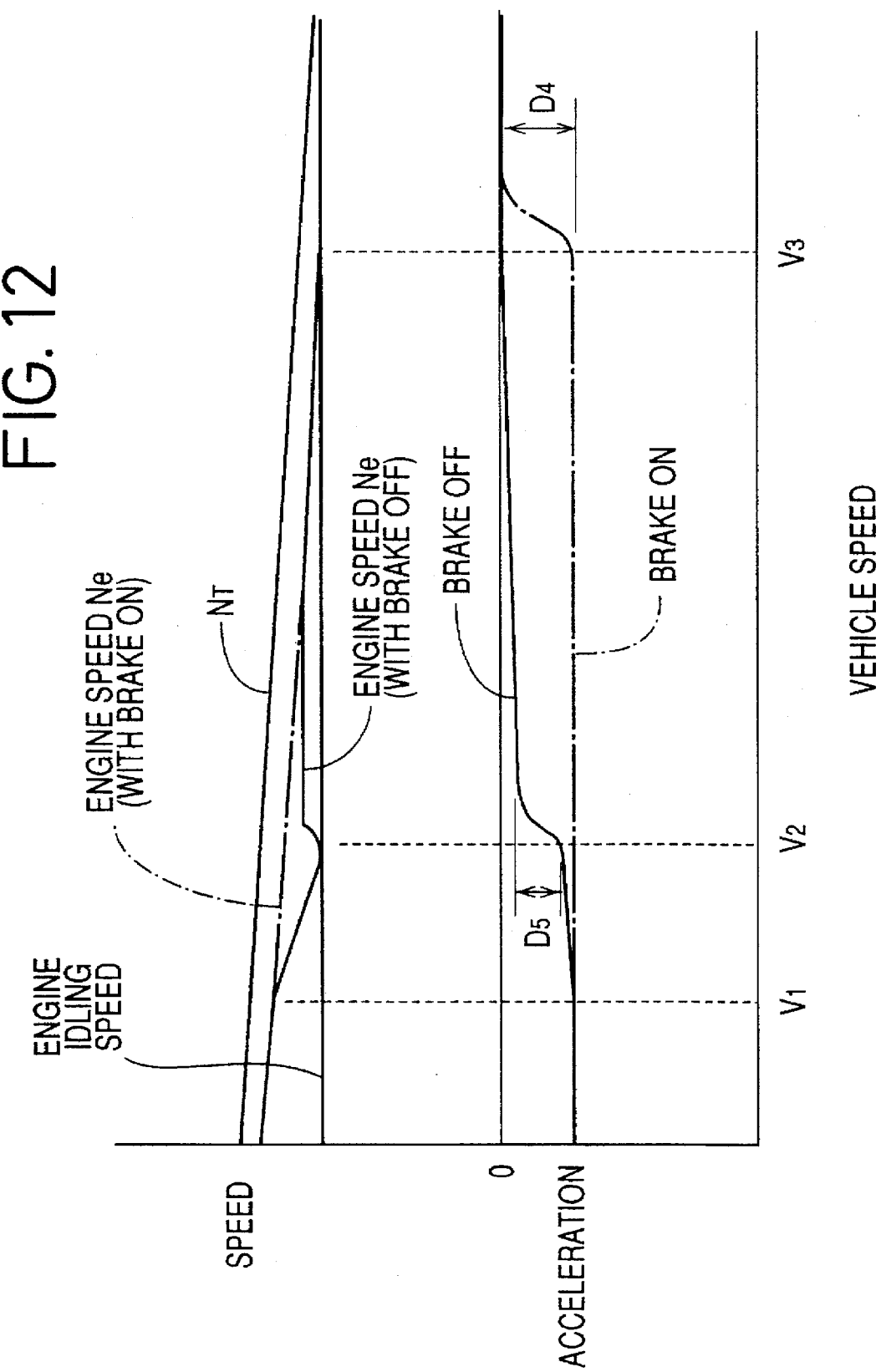
FIG. 12 is a view indicating a relationship between the vehicle and engine speed when the lock-up clutch is controlled according to the control routine of FIG. 11.

Referring next to FIGS. 11 and 12, there will be described a control routine executed by the transmission controller 78 according to a second embodiment of this invention, so that the deceleration slip control of the lock-up clutch 24 by the slip control means 194 is terminated at different values of the input shaft speed $N_T$ depending upon whether the braking system is in operation or not.

The control routine of FIG. 11 is initiated with step SB1 to determine whether the braking system is in operation. If an affirmative decision (YES) is obtained in step SB1, the control flow goes to step SB2 to determine whether the input shaft speed $N_T$ is lower than a predetermined threshold NTDBK which is determined by the terminating speed determining means 204 so that this threshold value NTDE is used when the braking system is in operation. The threshold value NTDBK of the input shaft speed $N_T$ is the speed value $N_T$ corresponding to the vehicle running speed V3 indicated in the graph of FIG. 12. The threshold speed value NTDBK is determined such that the actual engine speed Ne is expected to be equal to a level close to the idling speed $N_{IDL}$ when the input shaft speed $N_T$ has been lowered to the threshold value NTDBK during the deceleration slip control of the lock-up clutch 24.

If a negative decision (NO) is obtained in step SB2, it means that the vehicle running speed V is higher than the threshold value V3, and the input shaft speed $N_T$ is not lower than the threshold value NTDBK. That is, the vehicle running condition is in an area to the left of a vertical dashed line in FIG. 12 corresponding to the threshold vehicle speed value V3. In this case, the control flow goes to step SB3 to permit the slip control means 194 to effect or continue the deceleration slip control of the lock-up clutch 24.

When the input shaft speed $N_T$ has been lowered below the threshold value NTDBK with the vehicle speed V being lowered to V3 during repeated execution of the control routine of FIG. 11, an affirmative decision (YES) is obtained in step SB2, and the control flow goes to step SB4 corresponding to the deceleration slip control terminating means 206, to command the slip control means 194 to terminate the deceleration slip control of the lock-up clutch 24. Since the deceleration slip control is terminated after the input shaft speed $N_T$ has been lowered to a level in the neighborhood of the engine idling speed $N_{IDL}$, the amount of subsequent increase in the engine speed Ne by the input shaft speed is zeroed, and the negative acceleration given by the engine 10 to the vehicle is substantially zeroed. As a result, the amount of change or decrease of the negative acceleration is comparatively large as indicated at D4 in FIG. 12. During operation of the braking system, however, the negative acceleration given by the braking system to the vehicle is comparatively large, the overall amount of change of the negative acceleration (deceleration) is comparatively small even if the amount of change of the negative acceleration caused by the engine 10 is relatively large. Consequently, the zeroing of the negative acceleration given by the engine 10 to the vehicle immediately after the termination of the deceleration slip control of the lock-up clutch 24 will not cause a significant discomfort to the vehicle operator if the termination takes place during operation of the braking system.

When the braking system is not in operation, a negative decision (YES) is obtained in step SB1, and the control flow goes to step SB5 to determine whether the input shaft speed $N_T$ of the transmission 14 is lower than a threshold value NTDE which is determined by the terminating speed determining means 204 so that this threshold value NTDE is used when the braking system is not in operation. The threshold value NTDE is the speed value $N_T$ corresponding to the vehicle running speed V2 indicated in the graph of FIG. 12. If a negative decision (NO) is obtained in step SB5, it means that the input shaft speed $N_T$ is still sufficiently high, and that the deceleration slip control of the lock-up clutch 24 is still effective to prolong the fuel cut of the engine 10. In this case, therefore, the control flow goes to step SB3 to continue the deceleration slip control of the lock-up clutch 24.

The threshold speed value NTDE used when the braking system is not in operation is larger than the threshold speed value NTDBK used in step SB2 when the braking system is in operation. When the braking system is not in operation, the target slip speed NslipT of the lock-up clutch 24 is gradually increased after the input shaft speed $N_T$ is lowered to a level corresponding to the vehicle speed V1 indicated in FIG. 12, whereby the lowering rate of the engine speed Ne is increased. In view of this phenomenon, the threshold value NTDE used in step SB5 is also determined such that the actual engine speed Ne is expected to be equal to a level close to the idling speed $N_{IDL}$ when the input shaft speed $N_T$ has been lowered to the threshold value NTDE during the deceleration slip control of the lock-up clutch 24.

When the vehicle speed V has been lowered to V2 during repeated execution of the control routine of FIG. 11, that is, when the input shaft speed $N_T$ has been lowered to the threshold value NTDE, an affirmative decision (YES) is obtained in step SB5, and the control flow goes to step SB4 to command the slip control means 194 to terminate the deceleration slip control of the lock-up clutch 24. At this time, the fuel-cut control means 196 is turned off to terminate the fuel cut control of the engine 10 since the engine speed Ne has been lowered to a level close to the idling speed, whereby the fuel supply to the engine 10 is resumed. However, the input shaft speed $N_T$ is sufficiently higher than the engine idling speed $N_{IDL}$, so that the engine speed Ne is raised above the idling speed $N_{IDL}$ immediately after the termination of the deceleration slip control of the lock-up clutch 24. Then, the engine speed Ne is slowly lowered down to the idling level $N_{IDL}$ as the input shaft speed $N_T$ of the transmission 14 is lowered. Consequently, the negative acceleration given by the engine 10 to the vehicle is reduced by a comparatively small amount to a value smaller than zero. Namely, the amount of decrease of the negative deceleration of the vehicle after the termination of the deceleration slip control when the braking system is not in operation is equal to D5, which is smaller than the amount of decrease D4 when the braking system is in operation.

It will be understood from the above explanation of the present second embodiment that the brake operation detecting means 200 determines in step SB1 whether the braking system is in operation, and the deceleration slip control means 206 terminates the deceleration slip control of the lock-up clutch 24 by the slip control means 194, step SB4, when the input shaft speed $N_T$ of the transmission 14 is lowered to the relatively large threshold value NTDE if the braking system is not in operation. That is, when the braking system is not in operation, the effect of the input shaft speed $N_T$ to raise the engine speed Ne becomes considerably small even when the input shaft speed $N_T$ is comparatively high. Accordingly, the deceleration slip control of the lock-up clutch 24 is terminated when the input shaft speed $N_T$ is sufficiently higher than the engine idling speed $N_{IDL}$, if the braking system is not in operation. According to this arrangement, the rotation of the input shaft 20 rotating at the relatively high speed $N_T$ is transmitted to the engine 10 via the working fluid in the torque converter 12, even after the termination of the deceleration slip control of the lock-up clutch 24, whereby the engine speed Ne is raised from the idling speed $N_{IDL}$, and a considerably large negative drive force (negative acceleration) is given to the vehicle by the engine 10 to decelerate the vehicle.

As described above, the present slip control apparatus is arranged to terminate the deceleration slip control of the lock-up clutch 24 when the engine speed Ne has been lowered to a level close to the idling speed $N_{IDL}$, so that the amount of decrease of the negative acceleration or drive force immediately after the termination of the deceleration slip control is smaller as indicated at D5 in FIG. 12, even when the braking system is not in operation, than in the conventional apparatus wherein the negative acceleration is rapidly reduced to almost zero. Accordingly, the present arrangement is effective to eliminate a discomfort which would be given due to a large amount of decrease of the negative acceleration (negative drive force) of the vehicle immediately after the termination of the deceleration slip control of the lock-up clutch while the braking system is not in operation. When the braking system is in operation, on the other hand, the deceleration slip control of the lock-up clutch 24 is continued until the input shaft speed $N_T$ is lowered to the threshold value NTDBK, which is determined to be close to the fuel-cut speed $N_{CUT}$, so that the deceleration slip control is effective to improve the fuel economy of the vehicle.

In the embodiment of FIG. 12, the target slip speed NslipT of the lock-up clutch 24 is gradually increased after the input shaft speed $N_T$ is lowered to a level corresponding to the vehicle speed V1, so that the engine speed Ne is slowly lowered, while the negative acceleration given by the engine 10 is slowly reduced as the vehicle speed V is lowered from V1 to V2. Accordingly, the rate of change of the vehicle acceleration immediately after the termination of the deceleration slip control of the lock-up clutch 24 is is further reduced, and the discomfort given to the vehicle operator is eliminated with higher stability.

Referring next to the flow chart of FIG. 13, there will be described a control routine executed by the transmission controller 78 according to a third embodiment of this invention, so that the deceleration slip control of the lock-up clutch 24 by the slip control means 194 is initiated and terminated under different conditions depending upon whether the air conditioner is in operation or not.

Figure 13:
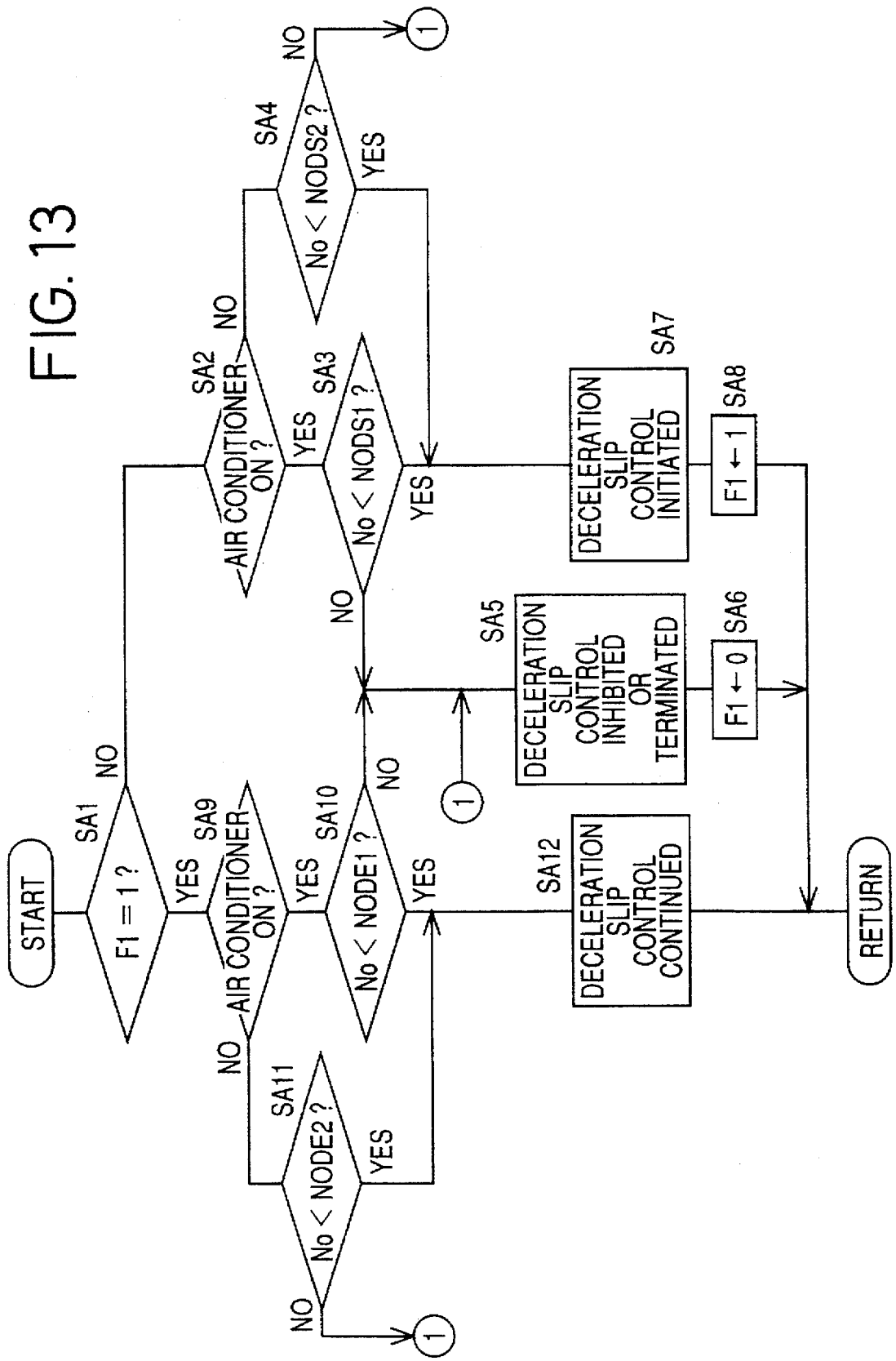
FIG. 13 is a flow chart illustrating a lock-up clutch control routine according to a further embodiment of the invention.

The control routine of FIG. 13 is initiated with step SA1 to determine whether a flag F1 is set at "1". When the flag F1 is set at "1", it indicates that the deceleration slip control of the lock-up clutch 24 is effected. When the deceleration slip control is not effected, a negative decision (NO) is obtained in step SA1, and the control flow goes to step SA2 to determine whether the air conditioner is in operation. If an affirmative decision (YES) is obtained in step SA2, the control flow goes to step SA3 to determine whether a speed No of the output shaft 42 of the automatic transmission 14 is higher than a slip control initiating threshold value NODS1. If a negative decision (NO) is obtained in step SA2, the control flow goes to step SA4 to determine whether the output shaft speed No is higher than a slip control initiating threshold value NODS2. If a negative decision (NO) is obtained in step SA3 or SA4, it indicates that the condition for initiating the deceleration slip control of the lock-up clutch 24 has not been satisfied, and the control flow goes to step SA5 in which the deceleration slip control is inhibited, and then to step SA6 to reset the flag F1 to "0". The slip control initialing value NODS1 used when the air condition is in operation is larger than the slip control initiating threshold value NODS2 used when the air conditioner is not in operation.

When the output shaft speed No of the automatic transmission 14 has increased to the slip control initiating threshold value NODS1 or NODS2, an affirmative decision (YES) is obtained in step SA3 or SA4, and the control flow goes to step SA7 to initiate the deceleration slip control of the lock-up clutch 24, and then to step SA8 to set the flag F1 to "1".

After the deceleration slip control has been initiated, an affirmative decision (YES) is obtained in step SA1, and the control flow goes to step SA9 similar to step SA2, to determine whether the air conditioner is in operation. If the air conditioner is in operation, step SA10 is implemented to determine whether the output shaft speed No is higher than a slip control terminating threshold value NODE1. If the air conditioner is not in operation, the control flow goes to step SA11 to determine whether the output shaft speed No is higher than a slip control terminating threshold value NODE2. These threshold values NODE1 and NODE2 are determined by the terminating speed determining means 204 such that the engine speed Ne is expected to be equal to the idling speed $N_{IDL}$ when the output shaft speed $N_T$ has become equal to the threshold value NODE1 or NODE2 during the deceleration slip control of the lock-up clutch 24. Since the engine idling speed $N_{IDL}$ is made higher when the air conditioner is in operation than than when it is not in operation, the slip control terminating threshold value NODE1 used when the air conditioner is in operation is determined to be larger than the threshold value NODE2 used when the air conditioner is not in operation. Further, the slip control initiating threshold values NODS1 and NODS2 are larger than the corresponding slip control terminating threshold values NODE1 and NODE2, respectively.

When the output shaft speed No is sufficiently higher with the engine speed Ne being sufficiently higher than the idling speed $N_{IDL}$, and affirmative decision (YES) is obtained in step SA10 or SA11. In this case, the deceleration slip control of the lock-up clutch 24 has a sufficient effect to improve the fuel economy of the vehicle, and the control flow goes to step SA12 to continue the deceleration slip control. When the output shaft speed No has been lowered down to the terminating threshold value NODE1 or NODE2, a negative decision (NO) is obtained in step SA10 or SA11, and the control flow goes to step SA5 to terminate the deceleration slip control of the lock-up clutch 24, and then to step SA6 to reset the flag F1 to "0". It will be understood that step SA5 corresponds to the deceleration slip control terminating means 206.

In the present third embodiment, the optional-device operation detecting means 198 detects in step SA9 an operation of the air conditioner, and the deceleration slip control terminating means 206 terminates the deceleration slip control of the lock-up clutch 24 in step SA5 when the output shaft speed No of the automatic transmission 14 is lowered to the threshold value NODE1 if the air conditioner is in operation. This threshold value NODE1 is larger than the threshold value NODE2 used if the air conditioner is not in operation. In this respect, it is noted that the output shaft speed No changes with the input shaft speed $N_T$. In the present arrangement, the deceleration slip control of the lock-up clutch 24 while the air conditioner is in operation is terminated when the input shaft speed $N_T$ is sufficiently higher than the engine idling speed $N_{IDL}$, which is made higher when the air conditioner is in operation than when it is not in operation. Therefore, the termination of the deceleration slip control of the lock-up clutch during operation of the air conditioner would not result in a decrease of the the engine speed Ne below the idling speed $N_{IDL}$, even though the idling speed $N_{IDL}$ is made higher during operation of the air conditioner.

The above arrangement according to the third embodiment of this invention is effective to prevent a rapid increase of the engine speed Ne toward the idling speed $N_{IDL}$ immediately after the termination of the deceleration slip control of the lock-up clutch 24 during operation of the air conditioner, which rapid increase would take place upon termination of the deceleration slip control according to the conventional arrangement.

Referring next to the flow chart of FIG. 14, there will be described a control routine executed by the transmission controller 78 according to a fourth embodiment of this invention, so that the deceleration slip control of the lock-up clutch 24 by the slip control means 194 is terminated under different conditions depending upon the currently established position of the automatic transmission 14, and depending upon whether the braking system is in operation or not, and whether the air conditioner is in operation or not.

Figure 14:
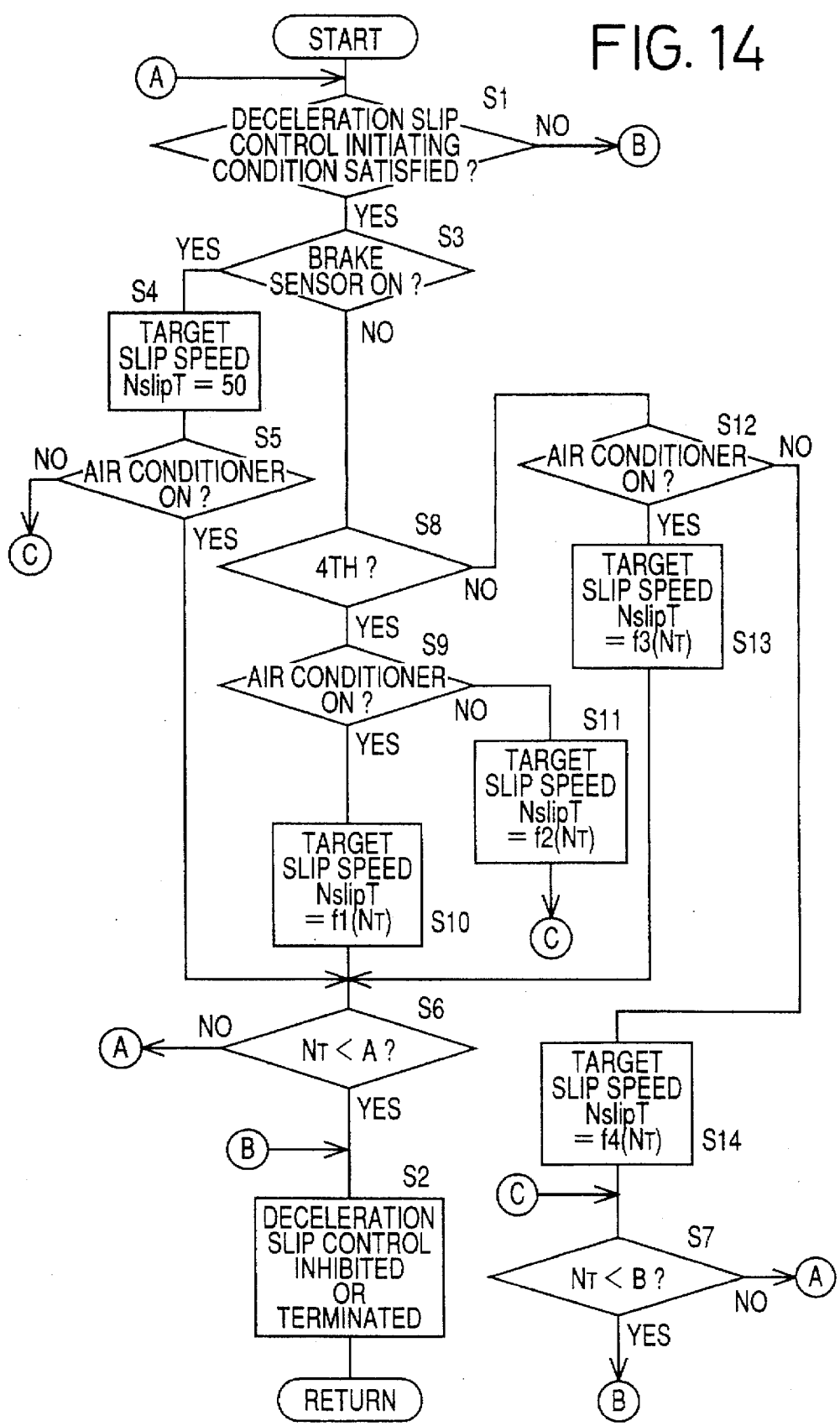
FIG. 14 is a flow chart illustrating a lock-up clutch control routine according to a still further embodiment of the invention.
Figure 15:
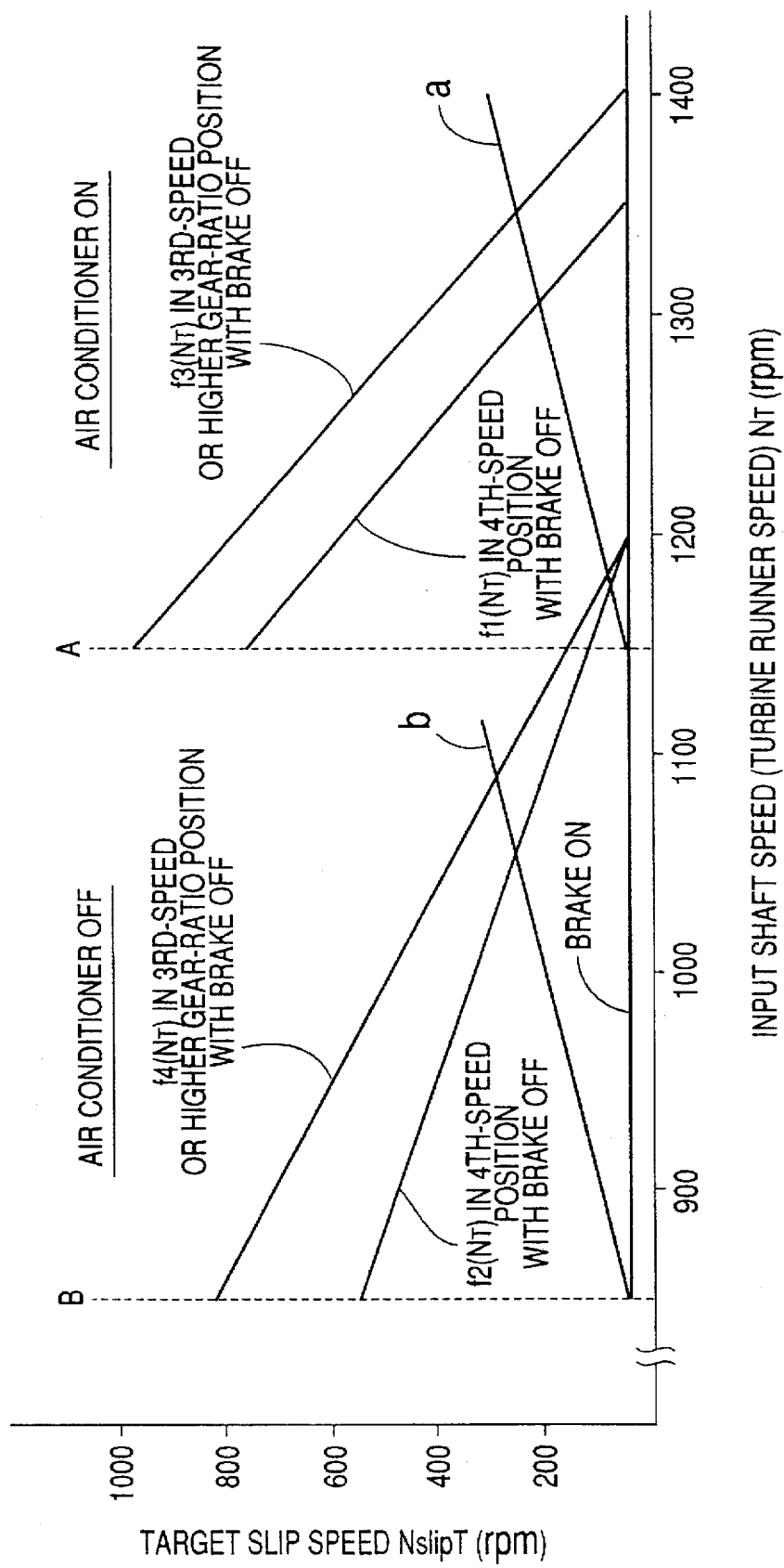
FIG. 15 is a graph indicating a relationship between the input speed of the automatic transmission and the target slip speed of the lock-up clutch when the lock-up clutch is controlled according to the control routine of FIG. 14.

The control routine of FIG. 14 is initiated with step S1 to determine whether a predetermined condition for initiating the deceleration slip control of the lock-up clutch 24 has been satisfied. If a negative decision (NO) is obtained in step S1, the control flow goes directly to step S2 in which the deceleration slip control of the lock-up clutch 24 is inhibited. When the predetermined condition has been satisfied, an affirmative decision (YES) is obtained in step S1, and the control flow goes to step S3 corresponding to the brake operation detecting means 200, to determine whether the braking system is in operation. If an affirmative decision (YES) is obtained in step S3, the control flow goes to step S4 corresponding to the target slip speed determining means 210. In step S4, the target slip speed NslipT of the lock-up clutch 24 is determined to be 50 r.p.m., for example, as indicated in FIG. 15. Step S4 is followed by step S5 corresponding to the optional-device operation detecting means 198, to determine whether the air conditioner is in operation. If an affirmative decision (YES) is obtained in step S5, the control flow goes to step S6. If a negative decision (NO) is obtained in step S5, the control flow goes to step S7.

Steps S6 and S7 are provided to determine whether the input shaft speed $N_T$ is lower than predetermined deceleration slip control terminating threshold speeds A and B, respectively, which have been determined by the terminating speed determining means 206 such that the threshold speed A used when the air conditioner is in operation is higher than the threshold speed A used when the air conditioner is not in operation. For instance, the threshold speed A is 1150 r.p.m., while the threshold speed B is 850 r.p.m. As long as a negative decision (NO) is obtained in step S6 or S7, the control flow returns to step S1. If an affirmative decision (YES) is obtained in step S6 or S7, the control flow goes to step S2 corresponding to the deceleration slip control terminating means 206, to terminate the deceleration slip control of the lock-up clutch 24 by the slip control means 194.

If the braking system is not in operation and a negative decision (NO) is obtained in step S3, the control flow goes to step S8 to determine whether the automatic transmission 14 is currently placed in the 4th-speed position. If an affirmative decision (YES) is obtained in step S8, the control flow goes to step S9 corresponding to the optional-device operation detecting means 198, to determine whether the air conditioner is in operation. If an affirmative decision (YES) is obtained in step S9, the control flow goes to step S10 corresponding to the target slip speed determining means 210, to determine the target slip speed NslipT of the lock-up clutch 24 as a function f1 of the input shaft speed $N_T$. Namely, NslipT=f1($N_T$), as indicated in FIG. 15. For instance, the target split speed NslipT=f1($N_T$) is 50 r.p.m. when the input shaft speed $N_T$ is 1350 r.p.m. or higher, and increases with a decrease in the input shaft speed $N_T$ when the speed $N_T$ is lower than 1350 r.p.m. Thus, the target slip speed NslipT is changed as a function of the input shaft speed $N_T$. In the present embodiment, step S10 also corresponds to the target slip speed changing means 212.

As a result of changing of the target slip speed NslipT, the engine speed Ne when the braking system is not in operation is lowered at a relatively high rate as indicated in the graph of FIG. 12 while the input shaft speed $N_T$ is 1350 r.p.m. or lower. Step S10 is followed by step S6 to determine whether the input shaft speed $N_T$ is lower than the deceleration slip control terminating threshold A. As long as a negative decision (NO) is obtained, the above steps including step S10 are repeatedly implemented to continue the deceleration slip control of the lock-up clutch 24 so that the actual slip speed Nslip coincides with the determined target value NslipT.

If a negative decision (NO) is obtained in step S9, that is, if the air conditioner is not in operation, the control flow goes to step S11 to determine the target slip speed NslipT as a function f2 of the input shaft speed $N_T$. Namely, NslipT= f2($N_T$), as also indicated in FIG. 15. For instance, the target slip speed NslipT is 50 r.p.m. when the input shaft speed $N_T$ is 1200 r.p.m. or higher, and increases with a decrease in the input shaft speed $N_T$ when the speed $N_T$ is lower than 1200 r.p.m. Thus, the target slip speed NslipT is changed as a function of the input shaft speed $N_T$. In the present embodiment, step S10 also corresponds to the target slip speed changing means 212. Therefore, like step S10, step S11 corresponds not only the target slip speed determining means 210 but also the target slip speed changing means 212.

If the automatic transmission 14 is currently placed in the 2nd-speed or 3rd-speed position, a negative decision (NO) is obtained in step S8, and the control flow goes to step S12 corresponding to the optional-device operation detecting means 198, to determine whether the air conditioner is in operation. Step S12 is followed by step S13 when the air conditioner is in operation, or by step S14 when the air conditioner is not in operation. In step S13, the target slip speed NslipT is determined as a function f3 of the input shaft speed $N_T$. Namely, NslipT=f3($N_T$). In step S14, the target slip speed Nslip T is determined as a function f4 of the input shaft speed $N_T$. Namely, NslipT=f4($N_T$). The target slip speed NslipT=f3($N_T$) is 50 r.p.m. when the input shaft speed is 1400 r.p.m. or higher, and increases with a decrease in the input shaft speed $N_T$ when the speed $N_T$ is lower than 1400 r.p.m., as indicated in FIG. 15. The target slip speed NslipT= f4($N_T$) is 50 r.p.m. when the input shaft speed $N_T$ is 1200 r.p.m. and increases with a decrease in the input shaft speed $N_T$ when the speed $N_T$ is lower than 1200 r.p.m., as also indicated in FIG. 15. Steps S13 and S14 are followed by step S6 and S7, respectively. Step S13 or S14 is repeatedly implemented to continue the deceleration slip control of the lock-up clutch 24 until the affirmative decision (YES) is obtained in step S6 or S7.

As indicated in FIG. 15, the target slip speed value NslipT=f1($N_T$) used when the air conditioner is in operation and when the transmission 14 is in the 4th-speed position is lower than the target slip speed value Nslip T=f3($N_T$) used when the air conditioner is in operation and when the transmission is in the 3rd-speed position. Further, the target slip speed value NslipT=f2($N_T$) used when the air conditioner is not in operation and when the transmission 14 is placed in the 4th-speed position is equal to or lower than the target slip speed value NslipT=f4($N_T$) used when the air conditioner is not in operation and when the transmission 14 is placed in the 3rd-speed position. In other words, the target slip speed NslipT is larger when the 3rd-speed position is established than that when the 4th-speed position is established, irrespective of whether the air conditioner is in operation or not.

It will be understood from FIGS. 14 and 15 that the threshold values A and B of the input shaft speed $N_T$ are used for terminating the deceleration slip control when the air conditioner is in operation and is not in operation, respectively. These threshold values A and B are determined irrespective of whether the braking system is in operation and whether the transmission 14 is placed in the 4th-speed position or not. When the braking system is not in operation, the target slip speed NslipT is increased with a decrease in the input shaft speed $N_T$ while the speed $N_T$ is lower than a predetermined limit. As a result, the engine speed Ne is rapidly lowered as the input shaft speed $N_T$ is lowered. Consequently, before the input shaft speed $N_T$ is lowered to the threshold value A or B, the engine speed Ne is lowered to the fuel-cut speed $N_{CUT}$, whereby the fuel cut control of the engine 10 by the fuel-cut control device 196 is terminated by the fuel-cut control terminating means 108, and the fuel supply to the engine 10 is resumed, so that the engine speed Ne is maintained at the idling speed $N_{IDL}$.

When the fuel-cut control terminating means 210 has commanded the fuel-cut control device 196 to terminate the fuel cut of the engine 10, an appropriate signal is fed to the deceleration slip control terminating means 206 to command the slip control means 194 to terminate the deceleration slip control of the lock-up clutch 24. Alternatively, an appropriate signal is fed to the deceleration slip control terminating means 206 to terminate the deceleration slip control when the engine speed Ne has been lowered below the fuel-cut speed $N_{CUT}$. Thus, the present slip control apparatus is arranged to terminate the deceleration slip control of the lock-up clutch 24 when the input shaft speed $N_T$ has been lowered below the predetermined deceleration slip control terminating threshold value A or B, or when the engine speed Ne has been lowered below the fuel-cut value $N_{CUT}$.

For example, the fuel-cut speed $N_{CUT}$ is determined to be about 1100 r.p.m. when the air conditioner is in operation, and about 850 r.p.m. when the air conditioner is not n operation. The values of the engine speed Ne corresponding to these fuel-cut values are indicated by straight lines "a" and "b", in FIG. 15. The fuel cut control of the engine 10 and the deceleration slip control of the lock-up clutch 24 are terminated at the values of the input shaft speed $N_T$, which values correspond to the points of intersection of the straight lines "a" and "b" and the straight lines representative of the functions fn($N_T$). If the braking system is not in operation, at this time, the target slip speed NslipT is determined or changed according to the function fn($N_T$) which is selected depending upon the currently established position of the automatic transmission 14. The target slip speed NslipT is higher when the gear ratio or speed ratio of the currently established position of the transmission 14 is comparatively high than when it is comparatively low. Namely, the target slip speed NslipT is higher when the 3rd-speed position or higher gear-ratio position ("2nd- or 1st-speed position) is currently established than when the 4th-speed position is currently established. As a result, the input shaft speed $N_T$ at which the engine speed Ne is lowered below the fuel-cut speed $N_{CUT}$ is higher when the braking system is not in operation than when the braking system is in operation, and when the transmission 14 is placed in the 3rd-speed or higher gear-ratio position than when the transmission 14 is placed in the 4th-speed position.

In the present fourth embodiment, too, the input shaft speed $N_T$ at which the deceleration slip control of the lock-up clutch 24 is terminated is higher when the braking system is not in operation than when it is in operation, and is higher and when the currently established position of the transmission 14 has a relatively high gear or speed ratio than when it has a relatively low gear or speed ratio.

While presently preferred embodiments of the present invention have been described in detail by reference to the accompanying drawings, the present invention may be otherwise embodied.

The first embodiment of FIGS. 9 and 10 is adapted to terminate the deceleration slip control of the lock-up clutch 24 at the different threshold values NTDE3 and NTDE4 of the input shaft speed $N_T$ depending upon whether the transmission 14 is placed in the 3rd-speed position or 4th-speed position. However, a threshold value or values of the input shaft speed $N_T$ may be provided corresponding to the other position of the transmission (e.g., 2nd-speed position) whose speed ratio is higher than that of the 3rd-speed position, if the deceleration slip control of the lock-up clutch 24 is effected with the transmission placed in that position.

In the first and second embodiments of FIGS. 9–12, the fuel cut of the engine 10 is also terminated when the deceleration slip control of the lock-up clutch 24 is terminated at the larger threshold value NTDE3 or NTDE of the input shaft speed $N_T$. However, the fuel cut may be continued after the termination of the deceleration slip control, until the engine speed Ne has been lowered below the fuel-cut speed $N_{CUT}$.

In the second embodiment of FIGS. 11 and 12, the target slip speed NslipT of the lock-up clutch 24 when the braking system is not in operation is gradually increased after the input shaft speed $N_T$ is lowered below a level corresponding to the vehicle speed V1, so that the amount of decrease of the negative acceleration after the termination of the deceleration slip control is made as small as D5. However, the target slip speed NslipT when the braking system is not in operation may be held constant, like the target slip speed NslipT when the braking system is in operation. The mere use of the larger threshold value NTDE when the braking system is not in operation is effective enough to reduce the amount of decrease of the negative acceleration of the vehicle so as to eliminate the discomfort which would be otherwise given to the vehicle operator immediately after the termination of the deceleration slip control of the lock-up clutch 24.

In the first, second and fourth embodiments of FIGS. 9–12 and FIGS. 14–15, the deceleration slip control is terminated when the input shaft speed $N_T$ of the transmission 14 is lowered below the threshold value NODE3, etc. However, the input shaft speed $N_T$ may be replaced by the output shaft speed No as used in the third embodiment of FIGS. 13 and 14, so that the deceleration slip control is terminated when the output shaft speed No is lowered below the predetermined threshold value. In this case, the actually detected output shaft speed No multiplied by the speed ratio I of the currently selected position of the transmission 14 should be compared with the threshold value for determining whether the deceleration slip control should be terminated or not.

Conversely, the third embodiment of FIG. 13 may be modified such that the input shaft speed $N_T$ rather than the output shaft speed No is compared with the threshold values to determine whether the deceleration slip control of the lock-up clutch 24 should be terminated or not. Further, the illustrated embodiments of FIGS. 9–15 may be modified such that the determination as to whether the deceleration slip control should be terminated is based on the engine speed Ne or any other speed parameter which varies with the input shaft speed $N_T$ during the slip control of the lock-up clutch 24 during deceleration or coasting of the vehicle.

In the fourth embodiment of FIGS. 14 and 15, the gradients of the straight lines representative of the functions fn($N_T$), and the lower limit of the output shaft speed $N_T$ above which the target slip speed NslipT increases may be suitably changed, provided that the lower limit is higher when the braking system is in operation than when it is not in operation, when the 4th-speed position of the transmission 14 is currently established than when the other speed position is established, and when the air conditioner is in operation than when it is not in operation.

In the fourth embodiment of FIGS. 14 and 15, the deceleration slip control of the lock-up clutch 24 is terminated when the fuel cut of the engine 10 is terminated, that is, when the engine speed Ne is lowered below the fuel-cut speed $N_{CUT}$ which is determined depending upon whether the air conditioner is in operation or not. However, the deceleration slip control need not be terminated upon termination of the fuel cut, since the deceleration slip control is substantially ineffective since the target slip speed NslipT is determined to be extremely high when the input shaft speed $N_T$ is lower than that represented by the straight line "a" or "b". That is, the fourth embodiment is adapted to increase the target slip speed NslipT with a decrease in the input shaft speed $N_T$, so as to assure a slow change of the negative acceleration of the vehicle, so that the negative acceleration would not substantially change even if the deceleration slip control is terminated at the same threshold value of the input shaft speed $N_T$ as used when the braking system is in operation.

In the illustrated embodiments, the linear solenoid valve SLU is adapted such that the SLIP CONTROL pilot pressure $P_{SLU}$ produced increases with an increase in the SLIP CONTROL current $I_{SLU}$ applied thereto. However, the linear solenoid valve SLU may be adapted such that the pilot pressure $P_{SLU}$ decreases with an increase in the current $I_{SLU}$. In this case, the current $I_{SLU}$ may be inverted, or the lock-up clutch control valve 100 is modified so that the slip speed Nslip increases with an increase in the pilot pressure $P_{SLU}$.

While the lock-up clutch 24 to be controlled by the slip control apparatus according to the present invention is incorporated in the torque converter 12, the lock-up clutch may be incorporated in a fluid coupling provided in the power transmitting system of a motor vehicle.

It is to be understood that the present preferred embodiments of the invention have been described above for illustrative purpose only, and that the present invention may be embodied with various other changes, modifications and improvements, which may occur to those skilled in the art, without departing from the spirit and scope of the invention defined in the following claims.

What is claimed is:

1. An apparatus for controlling a slip speed of a lock-up clutch interposed between an engine and an automatic transmission of a motor vehicle for direct connection therebetween, said apparatus having slip control means capable of effecting a deceleration slip control of said lock-up clutch during deceleration of the motor vehicle such that a difference between a rotating speed of said engine and a rotating speed of an input shaft of said automatic transmission is controlled as said slip speed, said apparatus comprising:

shift position detecting means for detecting a currently established operating position of said automatic transmission; and deceleration slip control terminating means for substantially terminating said deceleration slip control of said lock-up clutch by said slip control means when said rotating speed of said input shaft of said automatic transmission has been lowered to a threshold value which is determined depending upon a speed ratio of said currently established operating position detected by said shift position detecting means such that said threshold value is larger when said speed ratio of said currently established operating position is comparatively high than when said speed ratio is comparatively low, said speed ratio being equal to the rotating speed of said input shaft divided by a rotating speed of an output shaft of said automatic transmission.

2. An apparatus according to claim 1, further comprising:

fuel-cut control device for cutting a fuel supply to said engine during said deceleration slip control of said lock-up clutch by said slip control means; and fuel-cut control terminating means for terminating an operation of said fuel-cut control device to resume said fuel supply to said engine when said deceleration slip control of said lock-up clutch is terminated by said deceleration slip control terminating means.

3. An apparatus according to claim 1, wherein said slip control means controls said slip speed of said lock-up clutch such that an actual value of said slip speed coincides with a target value of said slip speed, said apparatus further comprising target slip speed changing means for changing said target value of said slip speed such that said target value increases with a decrease of the rotating speed of said input shaft of said automatic transmission.

4. An apparatus according to claim 1, further comprising terminating speed determining means for determining said threshold value of the rotating speed of said input shaft of said automatic transmission such that said threshold value is larger when said speed ratio of said currently established operating position of the automatic transmission is comparatively high than when said speed ratio is comparatively low.

5. An apparatus according to claim 1, wherein said slip control means controls said slip speed of said lock-up clutch such that an actual value of said slip speed coincides with a target value of said slip speed, said apparatus further comprising:

target slip speed determining means for determining said target value such that said target value is larger when said speed ratio of said currently established operating position of said automatic transmission is comparatively high than when said speed ratio is comparatively low; and target slip speed changing means for changing said target value of said slip speed such that said target value increases with a decrease of the rotating speed of said input shaft of said automatic transmission.

6. An apparatus for controlling a slip speed of a lock-up clutch interposed between an engine and an automatic transmission of a motor vehicle for direct connection therebetween, said apparatus having a braking system and including slip control means capable of effecting a deceleration slip control of said lock-up clutch during deceleration of the motor vehicle such that a difference between a rotating speed of said engine and a rotating speed of an input shaft of said automatic transmission is controlled as said slip speed, said apparatus comprising:

brake operation detecting means for detecting an operation of said braking system; and deceleration slip control terminating means for substantially terminating said deceleration slip control of said lock-up clutch by said slip control means when said rotating speed of said input shaft of said automatic transmission has been lowered to a threshold value which is determined depending upon an output of said brake operation detecting means, such that said threshold value is larger when said braking system is not in operation than when said braking system is in operation.

7. An apparatus according to claim 6, further comprising:

fuel-cut control device for cutting a fuel supply to said engine during said deceleration slip control of said lock-up clutch by said slip control means; and fuel-cut control terminating means for terminating an operation of said fuel-cut control device to resume said fuel supply to said engine when said deceleration slip control of said lock-up clutch is terminated by said deceleration slip control terminating means.

8. An apparatus according to claim 6, wherein said slip control means controls said slip speed of said lock-up clutch such that an actual value of said slip speed coincides with a target value of said slip speed, said apparatus further comprising target slip speed changing means for changing said target value of said slip speed such that said target value increases with a decrease of the rotating speed of said input shaft of said automatic transmission.

9. An apparatus according to claim 6, further comprising terminating speed determining means for determining said threshold value of the rotating speed of said input shaft of said automatic transmission such that said threshold value is larger when said braking system is in not operation than when said braking system is in operation.

10. An apparatus for controlling a slip speed of a lock-up clutch interposed between an engine and an automatic transmission of a motor vehicle for direct connection therebetween, said apparatus having an optionally activated device and including slip control means capable of effecting a deceleration slip control of said lock-up clutch during deceleration of the motor vehicle such that a difference between a rotating speed of said engine and a rotating speed of an input shaft of said automatic transmission is controlled as said slip speed, said apparatus comprising:

optional-device operation detecting means for detecting an operation of said optionally activated device; and deceleration slip control terminating means for substantially terminating said deceleration slip control of said lock-up clutch by said slip control means when said rotating speed of said input shaft of said automatic transmission has been lowered to a threshold value which is determined depending upon an output of said optional-device operation detecting means, such that said threshold value is larger when said optionally activated device is in operation than when said optionally activated device is not in operation.

11. An apparatus according to claim 10, further comprising:

fuel-cut control device for cutting a fuel supply to said engine during said deceleration slip control of said lock-up clutch by said slip control means; and fuel-cut control terminating means for terminating an operation of said fuel-cut control device to resume said fuel supply to said engine when said deceleration slip control of said lock-up clutch is terminated by said deceleration slip control terminating means.

12. An apparatus according to claim 10, wherein said slip control means controls said slip speed of said lock-up clutch such that an actual value of said slip speed coincides with a target value of said slip speed, said apparatus further comprising target slip speed changing means for changing said target value of said slip speed such that said target value increases with a decrease of the rotating speed of said input shaft of said automatic transmission.

13. An apparatus according to claim 10, further comprising terminating speed determining means for determining said threshold value of the rotating speed of said input shaft of said automatic transmission such that said threshold value is larger when said optionally activated device is in operation than when said optionally activated device is not in operation.

14. An apparatus according to claim 10, wherein said optionally activated device comprises an air conditioner.

* * * * *